(12) United States Patent
Allen

(10) Patent No.: US 10,417,927 B2
(45) Date of Patent: Sep. 17, 2019

(54) DIGITAL ASSIGNMENT ADMINISTRATION

(71) Applicant: Gove N. Allen, Provo, UT (US)

(72) Inventor: Gove N. Allen, Provo, UT (US)

( * ) Notice: Subject to any disclaimer, the term of this patent is extended or adjusted under 35 U.S.C. 154(b) by 1547 days.

(21) Appl. No.: 13/776,121

(22) Filed: Feb. 25, 2013

(65) Prior Publication Data

US 2013/0224719 A1  Aug. 29, 2013

Related U.S. Application Data

(60) Provisional application No. 61/603,599, filed on Feb. 27, 2012.

(51) Int. Cl.
*G09B 7/00* (2006.01)

(52) U.S. Cl.
CPC ..................... *G09B 7/00* (2013.01)

(58) Field of Classification Search
CPC ........................................... G09B 7/00
USPC ........................................... 434/350
See application file for complete search history.

(56) References Cited

U.S. PATENT DOCUMENTS

| | | | |
|---|---|---|---|
| 6,606,480 B1* | 8/2003 | L'Allier | G09B 7/02 434/219 |
| 8,175,511 B1* | 5/2012 | Sordo | G09B 7/00 434/118 |
| 2003/0211447 A1* | 11/2003 | Diesel | G06F 17/30902 434/118 |
| 2004/0033475 A1* | 2/2004 | Mizuma | G06Q 10/06 434/219 |
| 2004/0153509 A1* | 8/2004 | Alcorn | G06Q 30/06 709/205 |
| 2004/0191744 A1* | 9/2004 | Guirguis | G09B 5/00 434/322 |
| 2005/0058976 A1* | 3/2005 | Vernon | G09B 19/02 434/322 |
| 2005/0089835 A1* | 4/2005 | Soldavini | G06Q 30/0207 434/350 |
| 2005/0272024 A1* | 12/2005 | Ullman | G09B 7/02 434/362 |
| 2006/0003306 A1* | 1/2006 | McGinley | G09B 3/00 434/350 |
| 2008/0162323 A1* | 7/2008 | Menear | G06Q 30/04 705/35 |
| 2008/0280280 A1* | 11/2008 | Romer | G09B 7/06 434/356 |
| 2009/0226872 A1* | 9/2009 | Gunther | G09B 7/00 434/350 |
| 2009/0291426 A1* | 11/2009 | Polivka | G09B 7/00 434/350 |

(Continued)

*Primary Examiner* — Xuan M Thai
*Assistant Examiner* — Sadaruz Zaman
(74) *Attorney, Agent, or Firm* — Fabian VanCott; Tyler Jeffs

(57) ABSTRACT

A digitally administered assignment includes a workspace for a student and an internal automated grading code hidden from and not accessible by the student, the internal automated grading code configured to execute on the student's local computing device and to evaluate work performed by the student in the workspace. A method for digital assignment administration includes making an assignment with internal automated grading criteria available to a student and evaluating the assignment using the internal automated grading criteria on the student's local computing device.

17 Claims, 31 Drawing Sheets

(56) References Cited

U.S. PATENT DOCUMENTS

2010/0151431 A1\* 6/2010 Miller ...................... G09B 7/00
 434/350
2011/0065082 A1\* 3/2011 Gal .......................... G09B 7/02
 434/365
2011/0151426 A1\* 6/2011 Oberg ...................... G09B 5/00
 434/350

\* cited by examiner

Fig. 3

```
tSet "Weight Loss Evaluation", "Three friends (John, Anna, and Frank) decided to track changes in their weight over the summer break. The goa
   task "Use nested IF to account for three weight loss outcomes", "Use a nested IF function in cell E8 to display ""Lost Weight"" if the valu
      rule 1, "=Weight!E8=""Lost Weight""", "The value in cell E8 is not correct when D8 is 100", "Value in cell E8 is correct when D8 is 100"
         prefill "Weight!$D$8|100", False
      rule 1, "=Weight!E8=""Gained Weight""", "The value in cell E8 is not correct when D8 is 200", "Value in cell E8 is correct when D8 is 20
         prefill "Weight!$D$8|200", False
      rule 2, "=Weight!E8=""No Change""", "The value in cell E8 is not correct", "Value in cell E8 is correct"
         prefill "Weight!$D$8|192", False
      rule 1, "=SearchNoErr("IF"", FormulaContents(Weight!E8))>1", "The function in cell E8 is not correct", "IF function is used"
   task "Complete weight loss table", "Use the copy and paste features in Excel to complete the table for Anna and Frank.", "Weight!e8:e10"
      rule 0.5, "=returnFuncParts(Weight!E9,0)=""IF""", "The function in cell E9 is not correct", "The IF function is used"
      rule 0.5, "=returnFuncParts(Weight!E10,0)=""IF""", "The function in cell E10 is not correct", "The IF function is used"
      rule 2, "=Weight!E9=""Lost Weight""", "The value in cell E9 is not correct", "Value in cell E9 is correct"
      rule 2, "=Weight!E10=""Gained Weight""", "The value in cell E10 is not correct", "Value in cell E10 is correct"
   Set loadAssignment = a
End Function Sub inst(text As String, Optional textcolor As Long)
   a.addInstruction a.instructions.Count + 1, text, textcolor
End Sub Sub data(order As Integer, label As String, inputName As String, Optional value As String, Optional display As String, Optional required As Boo
   a.addDataField a.dataFields.Count + 1, order, label, inputName, value, display, required, comment
End Sub Sub tSet(title As String, text As String)
   a.addTaskSet a.taskSets.Count + 1, title, text
End Sub Sub task(name As String, text As String, hint As String)
   a.taskSets(a.taskSets.Count).addTask a.taskSets(a.taskSets.Count).tasks.Count + 1, name, text, hint
End Sub
```

*Fig. 4*

500 — Weight Loss Evaluation

502 — Three friends (John, Anna, and Frank) decided to track changes in their weight over the summer break. The goal of all three was to lose some weight. Information about their weights at different times is found on the worksheet named "Weight." Complete the tasks below to see how they did.

| Task # | Points | Task Description |
|---|---|---|
| 1 | 5 | Use a nested IF function in cell E8 to display "Lost Weight" if the value in cell C8 is greater than the value in cell D8 and "Gained Weight" if the value in cell C8 is less than the value in cell D8. Otherwise cell E8 should display "No Change". Construct your function in such a way that it can be reused to complete the table for Anna and Frank. |
| 2 | 5 | Use the copy and paste features in Excel to complete the table for Anna and Frank. |
| Total: | 10 | |

Demo Workbook

This assignment has a total of 100 points.

Complete the homework placing all answers in the cells indicated.

Do not insert rows or columns. The grader relies on the current worksheet structure.

University Gradebook

The tables below are used to track grade information for a large section of a class. Table 1 details student scores and final grade information. Table 2 contains information about the total number of points available in the class and the cutoff levels for each letter grade. Table 3 summarizes the number of students in the class and the average total score for all of the students. Finally, Table 4 details the number of students who earned each letter grade. Finish the tables by completing each of the tasks.

| Task # | Points | Task Description |
|---|---|---|
| 1 | 5/5 | Calculate the total exam score in cell E9 for the student in row 9 by adding the midterm exam score in cell C9 to the final exam score in cell D9. Construct your formula in such a way that it can be reused to complete column E of table 1 for all students. |
| 2 | 5/5 | Complete column E by using the copy and paste functions in Excel to reuse your formula in cell E9. |
| 3 | 3/5 | Use the SUM function in cell K9 to calculate the total homework score for the student in row 9. Construct your function arguments in such a way that the function can be reused to complete column K of table 1 for all students.<br>[-2] Cell K9 does not use the SUM function |
| 4 | 5/5 | Complete column K by using the copy and paste functions in Excel to reuse your function in cell K9. |
| 5 | 5/5 | Calculate the total score in cell L9 for the student in row 9. Reference the total exam score in cell E9 and the total homework score in cell K9 in your calculation. Construct your formula in such a way that it can be reused to complete column L of table 1 for all students. |
| 6 | 5/5 | Complete column L by using the copy and paste functions in Excel to reuse your function in cell L9. |
| 7 | 5/5 | Calculate the percentage score in cell M9 for the student in row 9 by dividing the total score in cell L9 by the total points possible in cell Q9 (notice that the total points possible is the same for all students). Construct your calculation such that it can be reused to complete column M of table 1 for all students. |
| 8 | 5/5 | Complete column M by using the copy and paste functions in Excel to reuse your function in cell M9. |
| 9 | 5/5 | Use the VLOOKUP function in cell N9 to calculate the letter grade for the student in row 9. Reference the percentage score in cell M9 and the reference table in range P12:Q23 as part of your calculation. Construct your function arguments in such a way that you can reuse your function to complete the rest of column N of the table for all students. |
| 10 | 5/5 | Complete column N by using the copy and paste functions in Excel to reuse your function in cell N9. |
| 11 | 0/5 | Calculate the total number of students in the class using the COUNTA function in cell Q26 (use an appropriate range in column N of the grade table as the argument).<br>[-2] The function in cell Q26 is not correct<br>[-2] The argument for the COUNTA function in cell Q26 is incorrect<br>[-1] The value in cell Q26 is incorrect |

Student Scores

The table below contains the student grade information from the Gradebook worksheet. Complete the table and form contents. You wish to complete each student who is not passing the class in the hopes that you might be able to help them complete the class successfully. Filter out those students who are passing the class already.

| Task # | Points | Description | Correct | Edited | Message |
|---|---|---|---|---|---|
| 1 | 5 | Use the IF function in cell N7 to display if the student in row 7 has passed the class. The logical test should compare the percentage score in cell M7 to .8 (the cutoff point for passing the class). The function should display "Pass" if the student is passing the class and "Not Pass" if the student is not passing the class. Construct your function in such a way that it can be reused to complete column N for all students in the table. | ✗ | 3 | The value in cell N55 is not correct (-2) |
| 2 | 5 | Complete column N using the copy and paste features of Excel to reuse your function in cell N7. | ✗ | 1 | The value in cell N20 is not correct (-1)<br>The value in cell N40 is not correct (-1)<br>The value in cell N60 is not correct (-1)<br>The value in cell N100 is not correct (-1) |
| 3 | 5 | Use a multi-level sort of the table to rearrange the students. In the same sort first sort by column N ("Pass?") in descending order and then by column M ("% Score") in descending order. | ✗ | 0 | The table is not sorted correctly (-1)<br>The table is not sorted correctly (-1)<br>The table is not sorted correctly (-1)<br>The table is not sorted correctly (-1) |
| 4 | 5 | Apply a filter on the table to display only those students who are not passing the class. Apply the filter on column N of the table. | ✓ | 5 | |
| 4 | 20 | Total | 1 | 9 | That's 45% for this section. |

DIGITAL ASSIGNMENT ADMINISTRATION

RELATED DOCUMENTS

The present application claims priority under 35 U.S.C. § 119(e) to U.S. Provisional Application No. 61/603,599, to Cove Allen, entitled "An Automated Mechanism for Local Evaluation of Student Performance," which application is hereby incorporated by reference in its entirety.

BACKGROUND

Tests or other graded assignments are mechanisms for a teacher to evaluate students' performance and the effectiveness of teaching methods. Additionally, graded assignments can be effective in motivating students and focusing them on the goals of the teacher. Graded assignments also reinforce learning by giving the students feedback on their work. However, creating effective assignments, administering the assignments, grading the student's responses, and deriving meaningful data about the learning experience of the students from assignments can consume a significant amount of time and effort.

BRIEF DESCRIPTION OF THE DRAWINGS

The accompanying drawings illustrate various examples of the principles described herein and are a part of the specification. The illustrated examples are merely examples and do not limit the scope of the claims.

FIG. 3 shows an illustrative screenshot of a workspace for creating an assignment in plain text according to one example of principles described herein.

FIG. 4 shows an example of generated Visual Basic for Applications (VBA) code from the text in the workbook shown in FIG. 3, according to one example of principles described herein.

FIG. 5 is an illustrative screenshot of task set instructions produced by the VBA code in FIG. 4, according to one example of principles described herein.

FIG. 8 is an illustrative screenshot of a docked task guide, according to one example of principles described herein.

FIG. 11 is an illustrative screenshot of a grade report, according to one example of principles described herein.

FIG. 12 is an illustrative screenshot of a student submissions workbook, according to one example of principles described herein.

FIG. 16 is an illustrative screenshot of an integrity analysis, according to one example of principles described herein.

FIG. 17 is an illustrative screenshot of a student report, according to one example of principles described herein.

FIG. 18 is an illustrative screenshot of editing a student report, according to one example of principles described herein.

Throughout the drawings, identical reference numbers designate similar, but not necessarily identical, elements.

DETAILED DESCRIPTION

Figure 1:
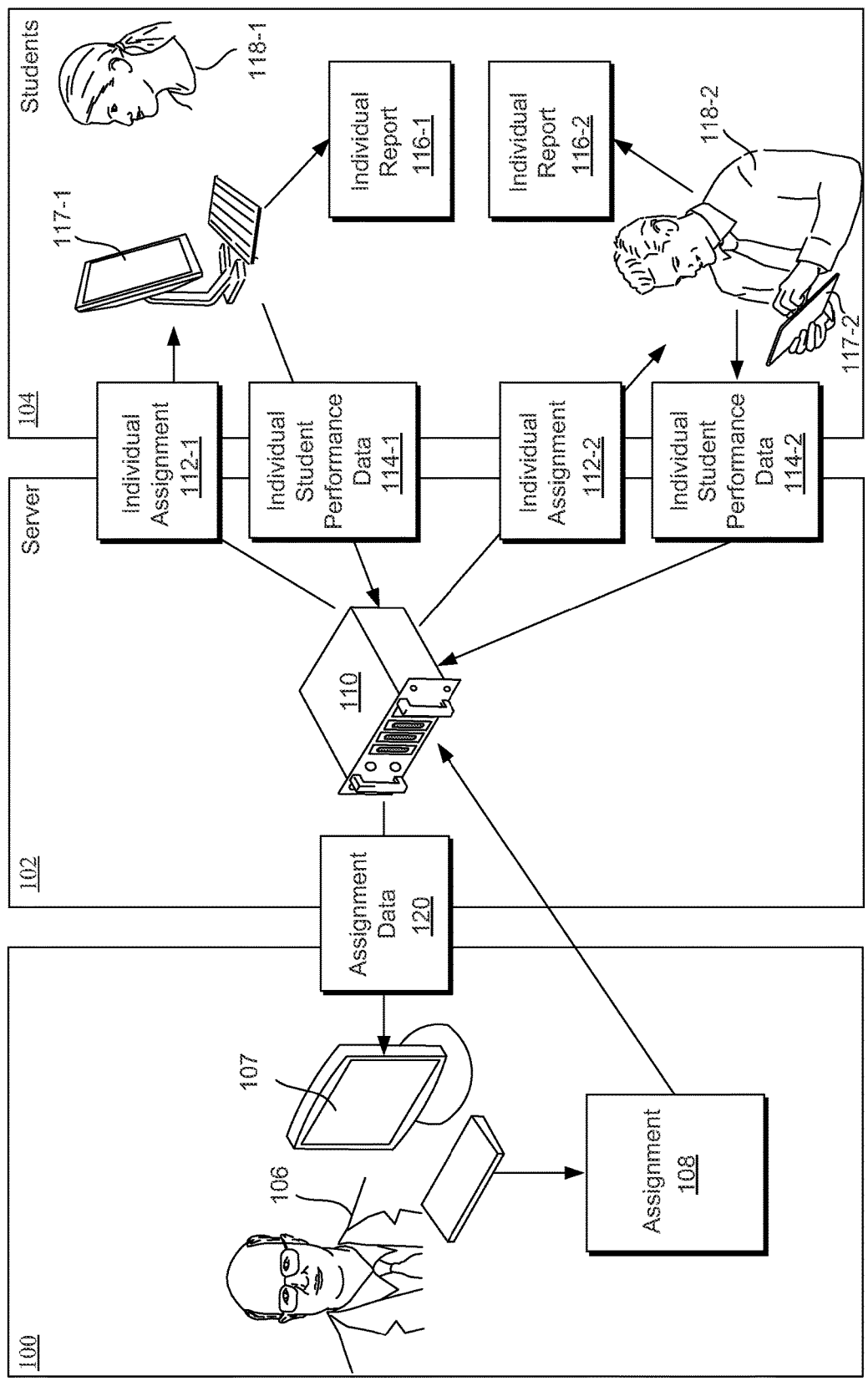
FIG. 1 is a diagram of a system for digitally administering an assignment, according to one example of principles described herein.

Software can be used as a tool for creation, distribution, completion, collection, and evaluation of assignments in education. Assignments may be distributed to the students using the Internet, networks, or storage media such as a compact disk or flash memory drive. For example, an instructor may make an assignment available through a website where students may download the assignment to their own computers. After downloading, they can complete the assignment and then upload a finished copy back to the instructor via the website. The instructor can then access and evaluate the completed assignment.

The use of software to administer assignments presents several challenges however. One challenge includes the server time required to allow online submission and grading of assignments. If an educational course includes a significant number of students and/or assignments with large file sizes, the bad on the server may be significant. This problem is compounded when a large number of the students want to submit their assignments at or near the same time (i.e. when the assignment is due). This may cause the server to go down or deny service, leaving the students without a way to submit their assignments. A less efficient method to accept and grade completed assignments may need to be used or expensive server hardware may be required to handle larger server loads in order to remedy the problem. All of these options drive up the cost of using software as a means to administer assignments.

For an assignment to be a successful teaching tool it is desirable that a student receive timely feedback on their work. The more delayed the feedback, the less effective the feedback is in helping a student to learn from the results of the assignment. For example, a student may submit an assignment to be graded and may not receive feedback until an instructor or someone assisting the instructor views and grades the assignment. This may create a significant delay between the time an assignment is submitted and when feedback is received.

Simpler assignments (such as multiple choice formats) may lend themselves to automated grading that is provided in real time to the student. This can speed up the feedback time but severely restricts the flexibility in creating assignments. Additionally, this type of grading also requires that the student maintain a network connection with the server. This may make the grading feedback less accessible. It would be advantageous to provide a way for students to receive feedback quickly and without the need to be connected to the grading server.

It is also desirable for an instructor to use the results of an assignment as an analysis of what students are learning. However, this analysis is typically limited to observing the solution submitted by the student. Missing are many intermediate steps made by the student in forming the solution. Perhaps a student makes a few mistakes first and then discovers those mistakes and corrects them. The instructor sees none of this and therefore lacks in depth information about the student's approach to the problem that could be useful.

Another challenge in administering assignments through software is the difficulty in verifying that the student personally produced the work submitted. Currently this is weakly achieved through school honor codes and by detecting when students submit unreasonably similar solutions, i.e. exception detection. However, it may be common for students to miss similar problems and it may be difficult and time consuming for a grader to analyze the assignment solutions. It would be desirable to employ a more thorough, efficient, and accurate method of verifying student integrity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

FIG. 1 is a diagram of a system for digital administration of assignments. The system includes an educational organization 100, a server 102, and students in an educational course 104.

The instructor 106 administers assignments 108 in the class digitally. As used in the specification and appended claims, the term "assignment" is used broadly. By way of example and not limitation, an "assignment" may be homework, a practice exercise, a quiz, test or other task given to the students to complete. Using a computing device 107, the instructor generates the assignment 108. The assignment includes a variety of features, including workspace in which student work is performed and secure executable code that facilitates digital administration of the assignment. For example, the assignment may include instructions for the problems, a software interface for entering the students' solutions to the problems, hints for assisting the students, internal grading criteria, and other features. In some examples, the assignment software includes the ability to grade itself with the internal secure executable code that runs the students' local computer resources.

The assignment is uploaded to the server 110 for storage and distribution. The students 118 access the server 110 and download their individual assignment 112. In this example, only two students 118-1 and 118-) are shown. However, there may be any number of students. The individual assignments 112-1 and 112-2 may or may not be the same. For example, if the assignments were tests, the instructor may make several different versions of the test. When the students download the tests from the servers, the students may have different versions of the same test. This may prevent the students from sharing answers or using other undesirable tactics to complete the assignment. In other examples, the assignment distributed to the students may be the identical but include code that presents different questions or different question patterns to each student. In other implementations, the assignments given to the students are identical and robust integrity algorithms track each student's behavior and answers.

After receiving the assignment, the students 118 work on the assignment on their individual computing devices 117. When the students feel that they are done with the assignment, they start the submission process. The secure executable code in the assignment is executed on the students' local computing devices 117 and evaluates the students' performance on the assignment. For example, the executable code may look at the students' answers and compare their answers to the correct answers. In some examples, the assignment may be more involved than simply inputting answers. For example, the students may write code to produce the desired results. In these instances, the executable code may run a number of test cases by inputting values into the student generated code. This allows the executable code to determine the robustness of the students' work. Additionally, the executable code may look at the number or type of steps the student took to arrive at the answer and how long it took the student to perform those steps. This can be useful in determining which concepts a student has mastered and which concepts the student still struggles with. As discussed below, the executable code may also use a variety of techniques to track the origin of the work. This may be useful in determining if the student has done the work by themselves or if the student has collaborated with other students.

The executable code produces one or more reports ("individual student performance data") that summarize the student's performance. These reports may not contain all of the student's work on the assignment. For example, if the students were assigned to create an Excel® workbook with extensive data and coding to provide analysis of that data, the size of the complete assignment may be large. Transmitting this large quantity of data for each student may not be necessary to evaluate a student's performance. Instead, the performance data may summarize the findings of the secure executable code embedded within the assignment.

Because the executable code is executed on the students' local computing devices, there is no need for network connectivity to make the evaluation, communication with a server, or remote computation performed by a server. Executing the code locally on the students' machines effectively distributes the grading computations over a number of computing devices. This can parallelize the computing operations and prevent overburdening of the server. The server can then play a much smaller role as a repository for the original assignment and the reports of the students' performance. Further, the locally executed code may provide very timely feedback to the students. This feedback may be provided either during their work on the assignment (such as hints, restatements of the problem to be solved, or pointing out specific answers that need to be corrected) or after the student has chosen to submit the assignment.

The individual student performance data 114-1 and 114-2 is sent to the server 110 where the instructor 106 may use the computing device 107 to access all the student's assignment data 120. The instructor may then use the computing device to perform a number of operations on the aggregated student performance data. For example, the instructor may use the computing device to check for patterns in the student responses that indicate collaboration. These patterns may include identical strings of answers, minimal time spent by one student entering the responses, and answers that were cut and pasted from another student's work, or other indications of collaboration. The instructor may also use the computing device to view the problems that were most commonly missed and the steps the students used in attempting to solve these problems. This can provide the instructor with valuable feedback about the effectiveness of his or her teaching and how best to adapt the instruction to the students. The instructor may also use the computing device to provide various grading approaches of the students' responses.

The example given above summarizes one implementation of principles related to digital assignment administration. A variety of other implementations could be used. For example, the assignment may be distributed in a variety ways, including on compact disc or on flash memory drives. Further, the student could upload the assignment to server or other machine and the executable code to evaluate student performance could be executed on a different end user machine (not the server machine). This could be beneficial If there is some problem with that student's installation of the basic software (i.e. the student installed Excel or Word but failed to install VBA). The different end user machine can run the executable code to grade the student's work, just as if it were the student's machine. The feedback produced is then uploaded to the server for distribution to the student. FIGS. 2-18 provide additional details regarding one illustrative implementation of the principles described herein.

Figure 2A:
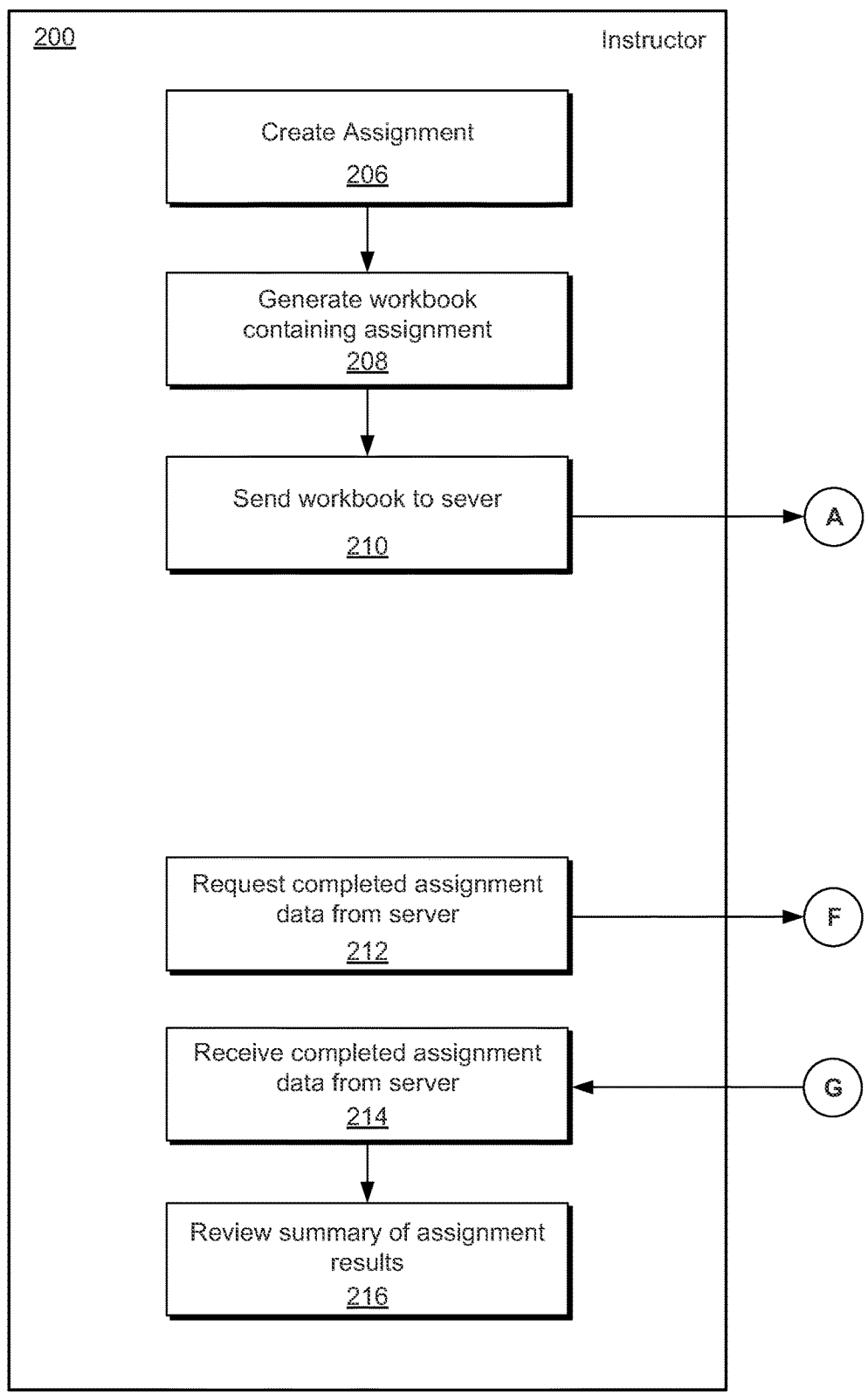
FIGS. 2A-2C are a flowchart of a method of administering an assignment, according to one example of principles described herein.

FIG. 2A shows a flow chart of an illustrative method for digitally administering an assignment for students learning Microsoft® Excel. The instructor portion 200 of the flow chart relates to an instructor who creates an assignment (block 206) in an Excel workbook. This assignment may be created in a variety of ways, including using or modifying a template document, directly writing the assignment in text (see e.g. FIG. 3), or an interface ("interview") that guides the instructor through creation/modification of an assignment (see e.g. FIGS. 19A-30), or other suitable technique.

Figure 3:
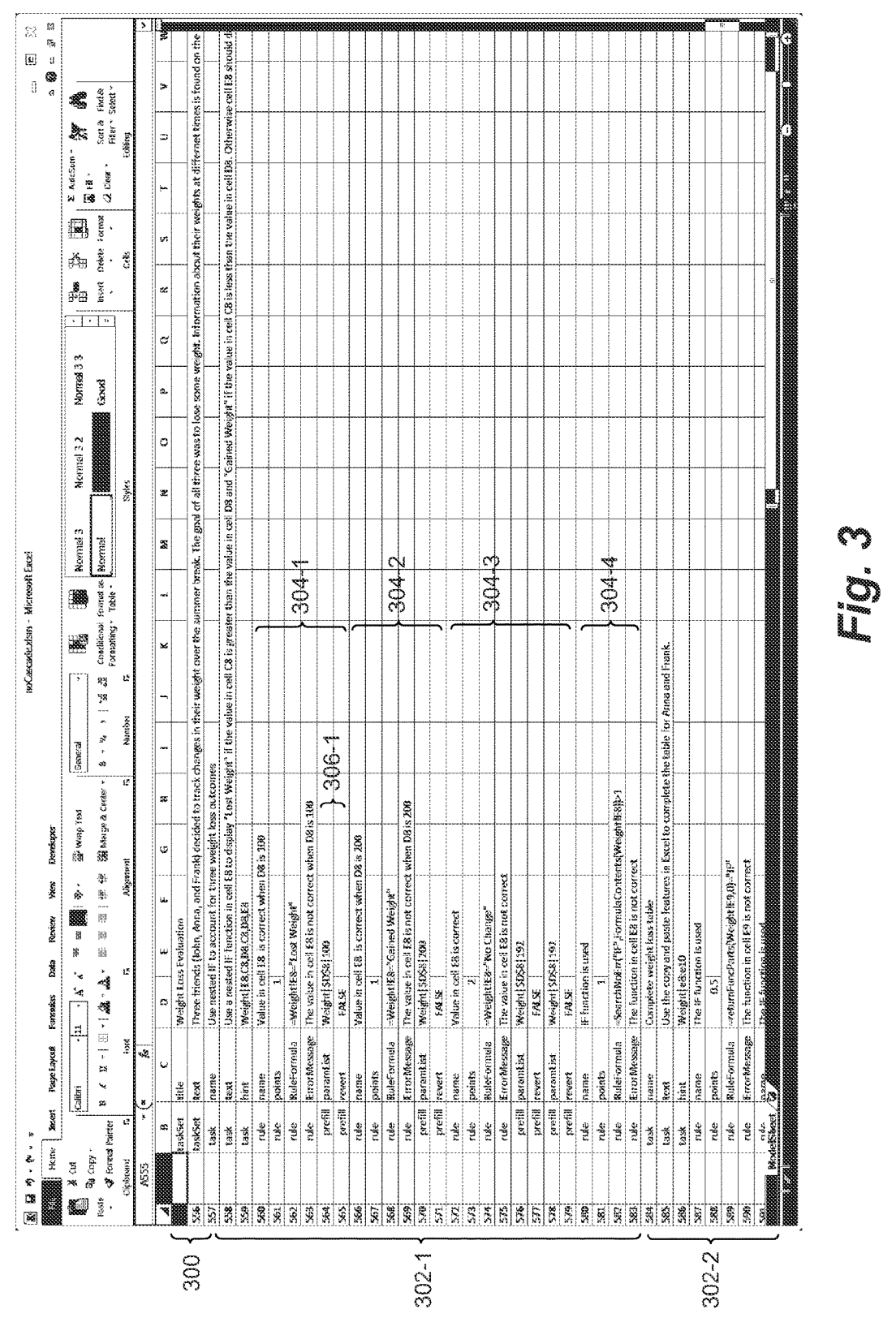

An example of an assignment created in an Excel workbook with plain text is shown in FIG. 3. In this implementation, an assignment is made up of a number of task sets 300. Each task set includes all of the data that is needed to present and evaluate the performance of a specific portion of the assignment. In this example, the task set 300 is titled "Weight loss evaluation" and presents text describing the problem. This text reads "Three friends (John, Anna, and Frank) decided to track changes in their weight over the summer break. The goal of all three was to lose some weight. Information about their weight at different times is found on the . . . ."

Each task set includes a number of tasks 302-1, 302-2 and sub elements associated with those tasks. Each task defines an activity to perform or a problem to solve, along with criteria for grading the activity. In this example, a first task 302-1 is named "Use nested IF to account for three weight loss outcomes" and contains the instructions to "Use a nested IF function in cell E8 to display 'Lost Weight' if the value in cell C8 is greater than the value in cell D8 and "Gained Weight" if the value in cell C8 is less than the value in cell D8. Otherwise cell E8 should . . . ". The task also includes a hint that can be used to assist the student in making the correct entry. The task includes several rules 304. The rules define different methods for evaluating the performance of the student in accomplishing the task. The first rule 304-1 states that the "Value in cell E8 is correct when D8 is 100." The rule assigns one point for compliance with this rule.

The rule may include a number of prefills 306-1. In general, prefills include a parameter list and a revert value. Prefills are used to evaluate the correctness of a student's response to a rule. For example, a student may be asked to enter a formula that finds the average for numbers contained in a set of cells. At evaluation time, prefills are used to check the formula produced by the student to see that it works with different sets of data to help determine that the formula is correct in general. In the example shown in FIG. 3, the prefill 306-1 includes a value to be entered in a specific cell and a revert parameter. When the rule is executed, the prefill will insert the value of 100 into the cell D8 in the student's worksheet The rule also defines a formula that automatically evaluates the student's performance by addressing cell E8 to determine if it contains the words "Lost Weight" when the prefill value of 100 is entered into cell D8. If the words "Lost Weight" are not found in cell E8, the student has incorrectly completed the assignment. For example, the student may have merely typed the words "Lost Weight" or "Gained Weight" into the cells by looking at the values on the chart. However, the prefill changes the values in the chart and if the student has not correctly entered the nested IF instruction into the cells, the result will not be correct under the altered situation.

The plain text entry of the assignment with all of the task sets, tasks, rules, and prefills can take a considerable amount of instructor time. This can be mitigated in a variety of ways. For example, a number of pre-constructed assignments ("templates") can be supplied to the instructor. Because the assignment is defined in plain text, the instructor can easily understand the assignment and make the desired changes to the assignment in any of a wide range of editors. The instructor can choose specific task sets to create a customized assignment. The instructor can also easily alter the assignment, prefill values, points assigned to each rule, hints, and other aspects of the assignment.

Returning to FIG. 2A, the instructor generates a workbook containing the assignment (block 208). In this illustrative implementation, this is achieved with Visual Basic® for Applications (VBA) code that interprets the plain text in the Excel document (or from another source) to produce VBA code that defines the assignment instructions and workbook. FIG. 4 shows an example of generated VBA code. In this example, the VBA code contains the same task sets, rules, prefill values, points assigned to each rule, hints, and other aspects of the assignment defined in the plain text Excel workbook in FIG. 3. These rules and prefill values are encrypted and stored on a hidden worksheet within the assignment. This prevents the students from becoming distracted by the VBA code.

VBA code that provides functionality for recording changes made to the workbook and interacting with a server is also added. This code creates a log of the changes a student makes to the assignment workbook; in this implementation, the time of each change is also recorded. For example, a student enters a formula into cell B42 which sums all the values contained in cells A3 to A17 and displays them in cell B42. The VBA code logs the change along with a timestamp. Later, the student realizes that more rows should be included and extends the formula to include all the cells from A3 to A29. This change is also recorded along with a timestamp. When the instructor receives the results of the assignment he or she is able to see the log of the student's changes and may better understand the process that went into the student's solution. Additional VBA code is also added to provide the workbook with the functionality to interact directly with a server for the purpose of reporting the student's performance on the assignment (as further described with regard to FIG. 10 and block 242 of FIG. 2C).

Figure 6:
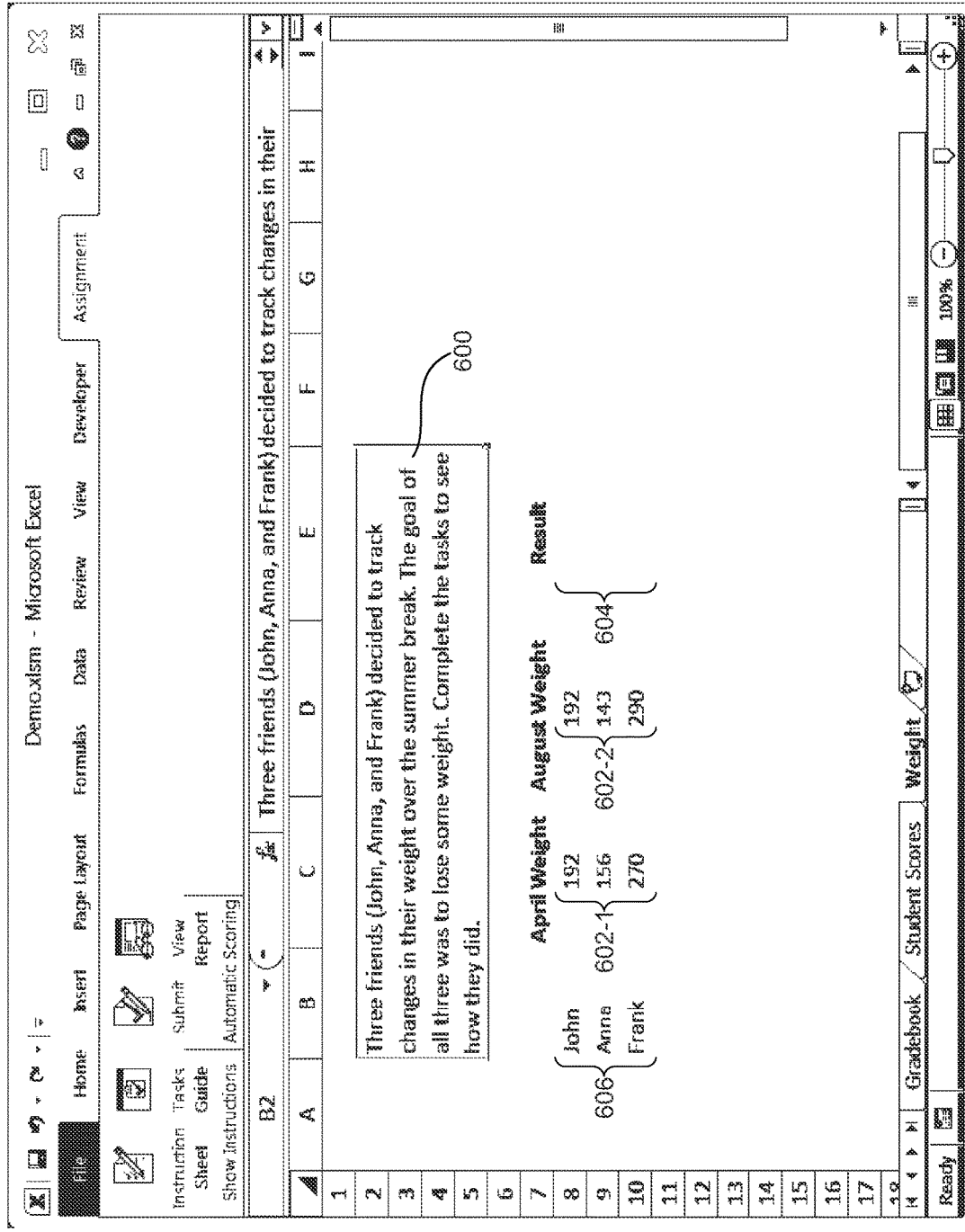
FIG. 6 is an illustrative screenshot of a workbook containing a generated assignment, according to one example of principles described herein.

FIGS. 5 and 6 show a portion of the generated assignment seen by students. FIG. 5 shows an example of generated task set instructions. In this implementation the task set instructions include a title 500, a description 502, and a list of numbered tasks (504-1 and 504-2). Each task in the list includes an instruction (506-1 and 506-2) and a number of points possible (508-1 and 508-2). The task set instructions also include a total number of points possible 510. The task set instructions describe each task required to complete the assignment. The assignment is contained in an assignment workbook. FIG. 6 shows an example of a workbook containing a generated assignment. In this example, information for a task set is shown. The information includes a description 600, data 602-1 and 602-2, cells designated for the student solution 604, and text 606 to label each set of data. In this example, the task set description 600 is similar to the description included in the task set instructions 502 in FIG. 5. The data sets are arranged in two columns: a first for April weight and second for August weight.

Figure 2B:
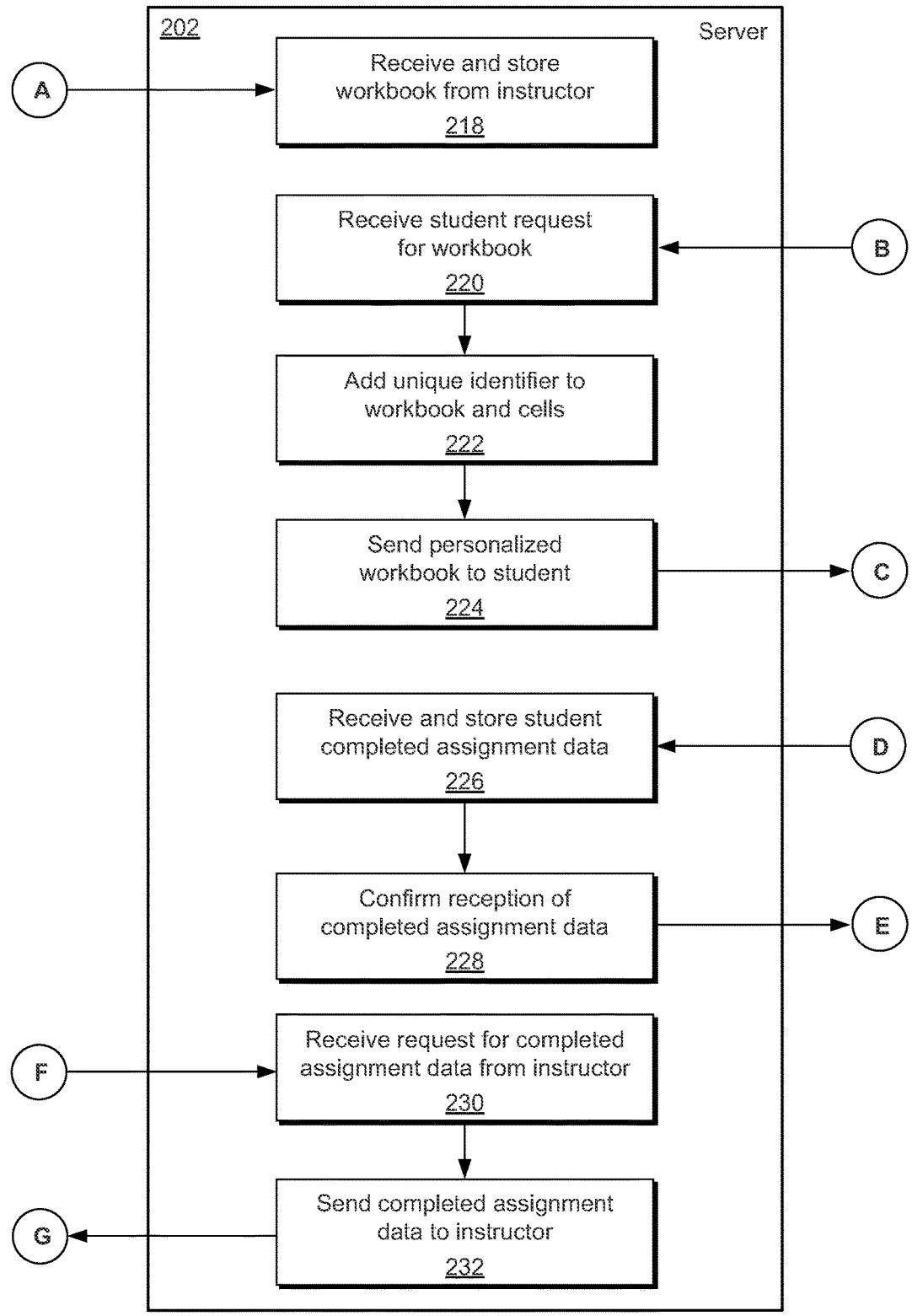
Figure 2C:
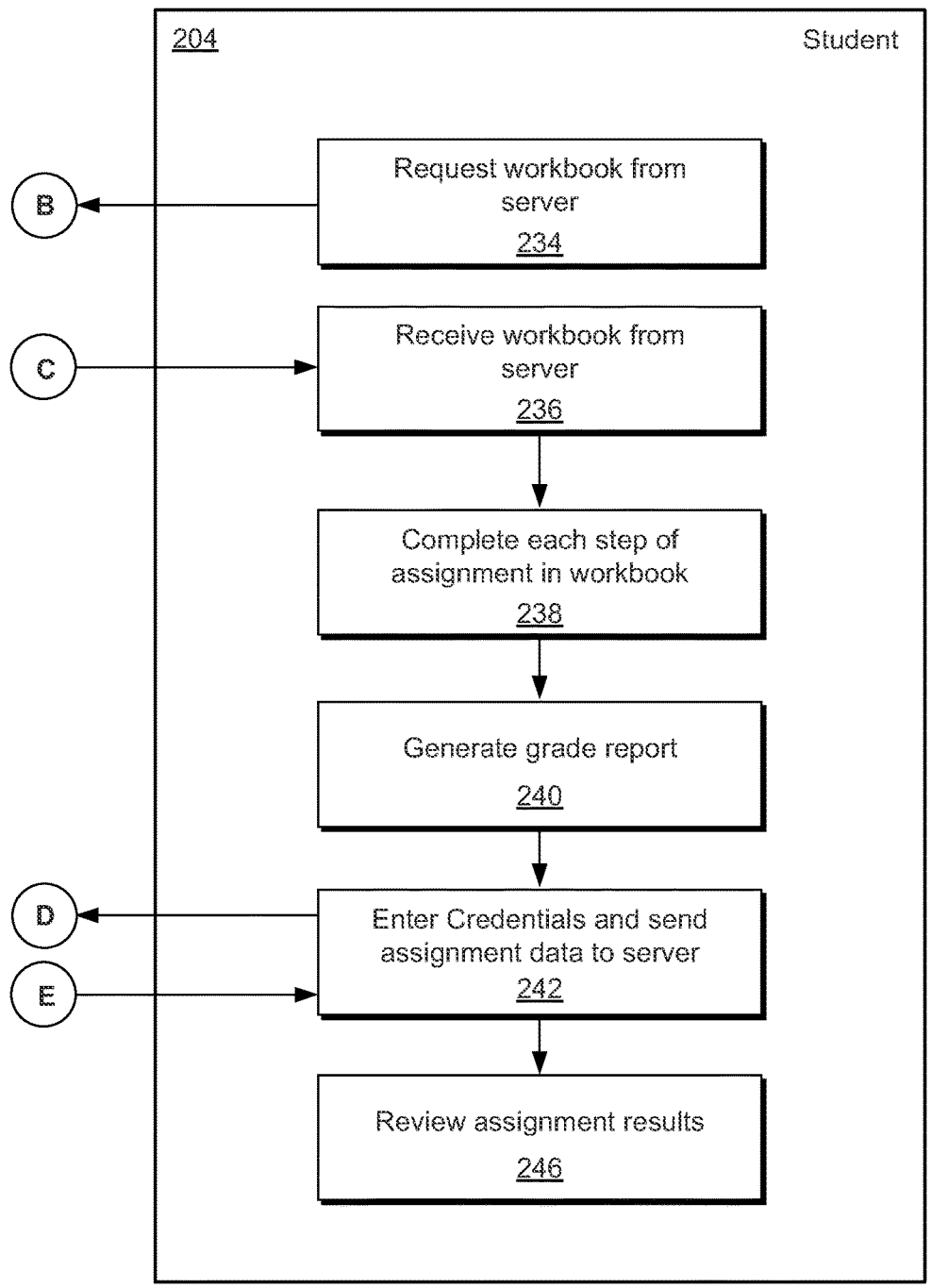

Returning to FIG. 2A, a copy of the workbook containing the assignment is sent to the server (block 210) through path "A." FIG. 2B contains the portions of the illustrative method that are performed by the server 202, The server receives and stores a copy of the workbook from the instructor (block 218) through path "A." FIG. 2C contains the student portion of the flow chart 204. The student requests a copy of the workbook from the server (block 234) and the server receives the student's request for the workbook (block 220, FIG. 2B) through path "B." As a part of this request the student provides credentials that identify him or her individually. For example, the student may enter his or her university identification number and password or name and password or user name and identification number, etc. In this implementation, before serving the workbook, the server inserts a hidden unique student identifier in the student's workspace. For example, the server may place one or more unique student identifiers on the workbook itself using Excel custom workbook properties (block 222). This may be done in a variety of ways. For example, the custom identifier may be placed in one or more cells of the worksheet using the interior patternColor property (which is not visible to the student). Should the student choose to copy a solution from another student's worksheet into their own assignment, this patternColor property can be used to trace the original source of the cell. These marked cells may include cells that contain calculations of intermediate steps, final answers, or other cells. This may show if the student does not do work personally and from which student's workbook the solution is copied. A variety of other security features could also be included in the workbook.

Figure 7:
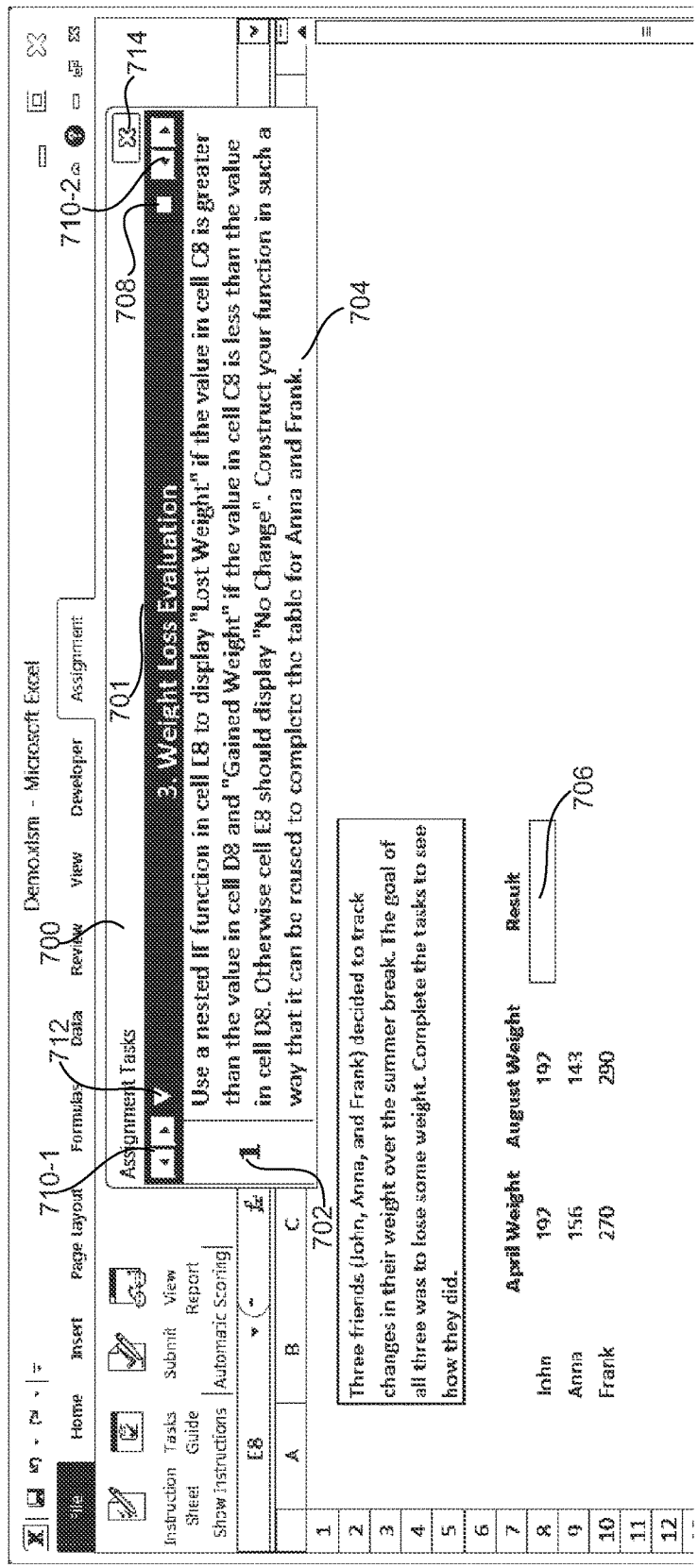
FIG. 7 is an illustrative screenshot of a floating task guide, according to one example of principles described herein.
Figure 8:
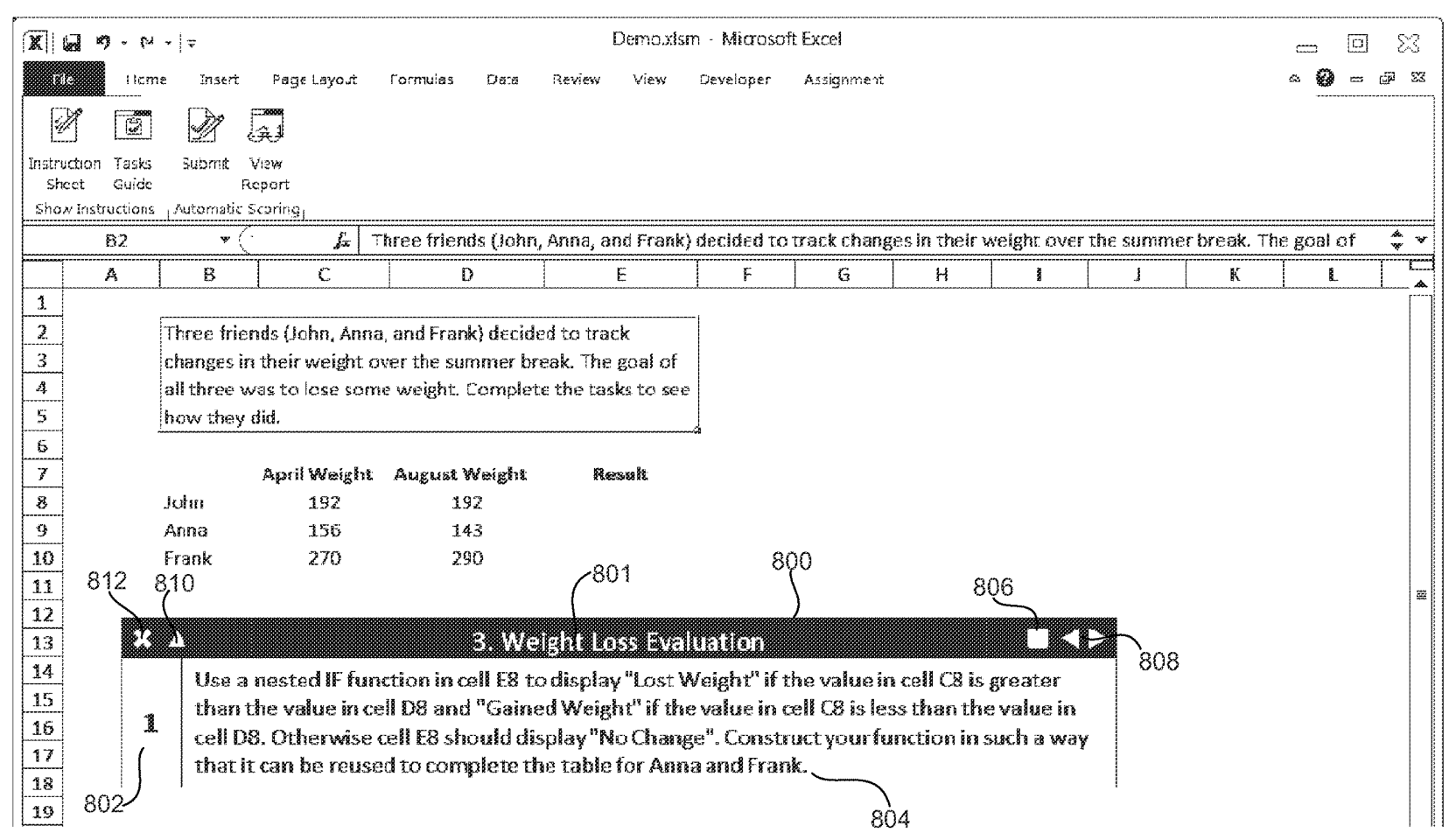

The server sends the personalized workbook to the student (block 224, FIG. 2B) through path "C." The student receives the workbook from the server (block 236, FIG. 2C) through path "C." The student opens the workbook in Excel and (ideally) completes each step of the assignment in the workbook (block 238, FIG. 2C). A student may use a task guide to help complete an assignment. FIG. 7 shows one example of a floating task guide. The task guide is incorporated into the assignment and helps the student to navigate their way through the various task sets and tasks in the assignment. The illustrative task guide window 700 contains examples of some of the possible elements of the task guide. The title 701 indicates the task set number, "3" and the subject of the task set, "Weight Loss Evaluation." The task guide also includes the current task number 702, "1" and instructions for that task 704. The task guide also automatically highlights the cell 706 where the solution for the current task is to be entered. Once the student is finished with the task he or she may mark the task as finished using a check box 708. At any time, the student may move to the next task or revisit previous tasks by using the next and previous task buttons 710-1 and 710-2. In addition to a floating window orientation, the task guide may also be used in a docked orientation. FIG. 8 shows one example of a docked task guide. The docked task guide is similar to the floating task bar only it is contained within the same window as the workbook instead of a separate floating window. As in the floating orientation, the docked task bar 800 includes a title 801, task number 802, task instructions 804, check box 806, and previous and next task buttons 808. The student may choose to switch between the two orientations. This may be archived by clicking the arrow button 712 in FIG. 7 to switch from floating to docked orientation or the arrow button 810 in FIG. 8 to switch from docked to floating orientation. Additionally, the student may close the task guide by clicking the close button 714 in FIG. 7 or the close button 812 in FIG. 8. Use of the task bar may help the student to focus on the learning material and spend less time reconciling the instructions and the workbook.

Figures 9, 10:
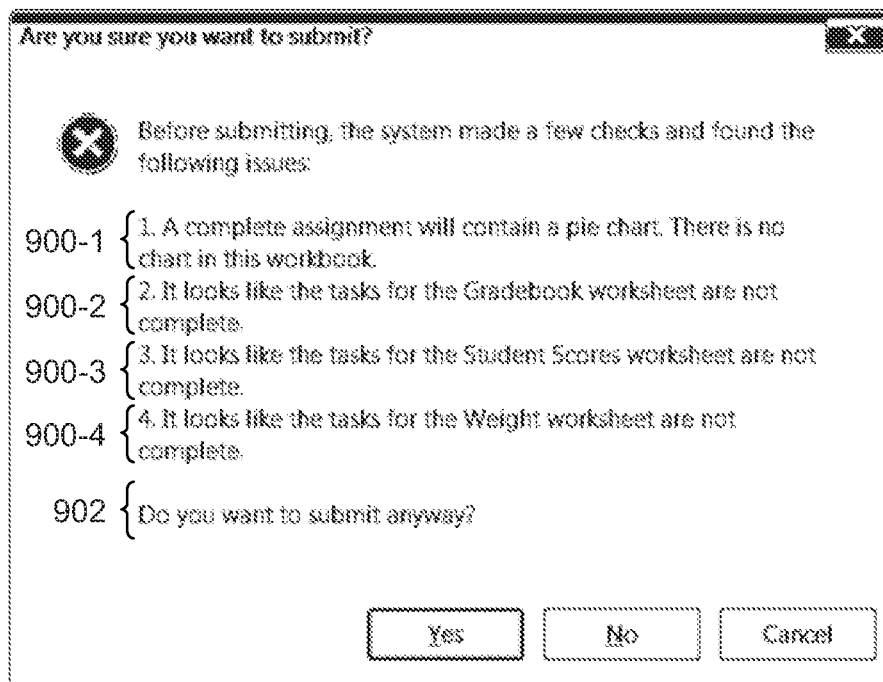
FIG. 9 is an illustrative screenshot of pre-check prompt, according to one example of principles described herein.
FIG. 10 is an illustrative screenshot of an assignment submission prompt, according to one example of principles described herein.

When the student is ready to submit the assignment the student clicks a button that causes the VBA code to generate a grade report (block 240, FIG. 2C). As a preliminary step in the submission process, the VBA code will do a check to make sure all of the assigned tasks have been completed. If not all the tasks are complete the student will see a pre-check prompt; FIG. 9 is an example of a pre-check prompt. The pre-check prompt reports issues found in the assignment. In this example, there are four issues 900-1, 900-2, 900-3, and 900-4. One of these issues 900-4 reads, "It looks like the tasks for the Weight worksheet are not complete." The pre-check prompt includes text 902 to ask the student, "Do you want to submit anyway?". Once the submission process is complete and the grade report is generated the student is not be able to change the solutions. The student may decide to stop and fix the issues and then submit or go ahead with the submission process. Upon confirmation that the student desires to submit the assignment, the rules contained in the workbook are applied to the student's solution(s). As part of the evaluation, the rules may look for specific values in predetermined cells. Additionally, the code may change values, equations, or text in the student's solutions to test the robustness of the student's answers. These changes are made by the prefills defined when the assignment was created (block 206, FIG. 2A), VBA code in the workbook reviews the custom properties on the workbook, on each sheet, and on each cell that has a modified interior patternColor property and collects the different values found therein. A report is generated that describes the student's performance. In one implementation, the steps described above are performed locally on the student's computing device.

To complete the submission process, the student is shown a prompt (FIG. 10 is an example of a prompt) to enter credentials to authorize submission of the report to the server (block 242, FIG. 2C). For example, these credentials may include the student's first name, last name, email address, university identification number, and password. The VBA code contacts the server and authenticates with the student's credentials. The VBA code records the student identifier on the server through path "D" (block 242, FIG. 2C, and block 226, FIG. 2B). In some implementations, the VBA code can generate two unique random numbers between 0 and 16 million and a hash of the two numbers and combines the three into a single string value used to identify the specific grading instance. The VBA code inserts the two random numbers as the interior patternColor for two specific cells. This is used to check that data from the workbook that a student submitted matches a particular workbook should the student try to dispute a score. The VBA code sends the username of the student, identifier of the assignment, and the summary of how the student performed on each rule to the server. The VBA code also sends the student identifier used to mark the downloaded workbook in the custom properties and in the cell's interior pattern Color. The VBA code uploads all distinct values found in the custom properties and the cells' interior patternColor properties. The VBA code uploads the hash used to identify the specific grading instance, the log of cell changes, and a time stamp taken from the system clock of the student's machine. All of this information is uploaded to the server through path "D" using a private key encryption scheme.

The server receives and stores the student's completed assignment data (block 226, FIG. 2B) through path "D" and then confirms reception of the completed assignment data (block 228, FIG. 2B), through path "E."

The student may now review the assignment results (block 246, FIG. 2C). FIG. 11 shows an example of a grade report. Each task set is listed in order along with its respective name and instruction text. The tasks are shown with their number, the points earned out of points possible, and description. For example, FIG. 11 shows that for task 3 the student received three out of five points 1100. In the event where a student does not receive all the points for a task, specific items are listed that the student missed, along with the number of points missed for those items. 1102 shows that the student missed two of the five points for task three because "Cell K9 does not use the SUM function" a requirement listed in the task instructions.

The instructor requests the completed assignment data from the server (block 212, FIG. 2A) to review and record student performance and the server receives the instructor's request for the completed assignment data (block 230, FIG. 2B) through path "F." The server then serves the data to the instructor (block 232, FIG. 2B) and the instructor receives the completed assignment data (block 214, FIG. 2A) through path "G."

Figure 12:
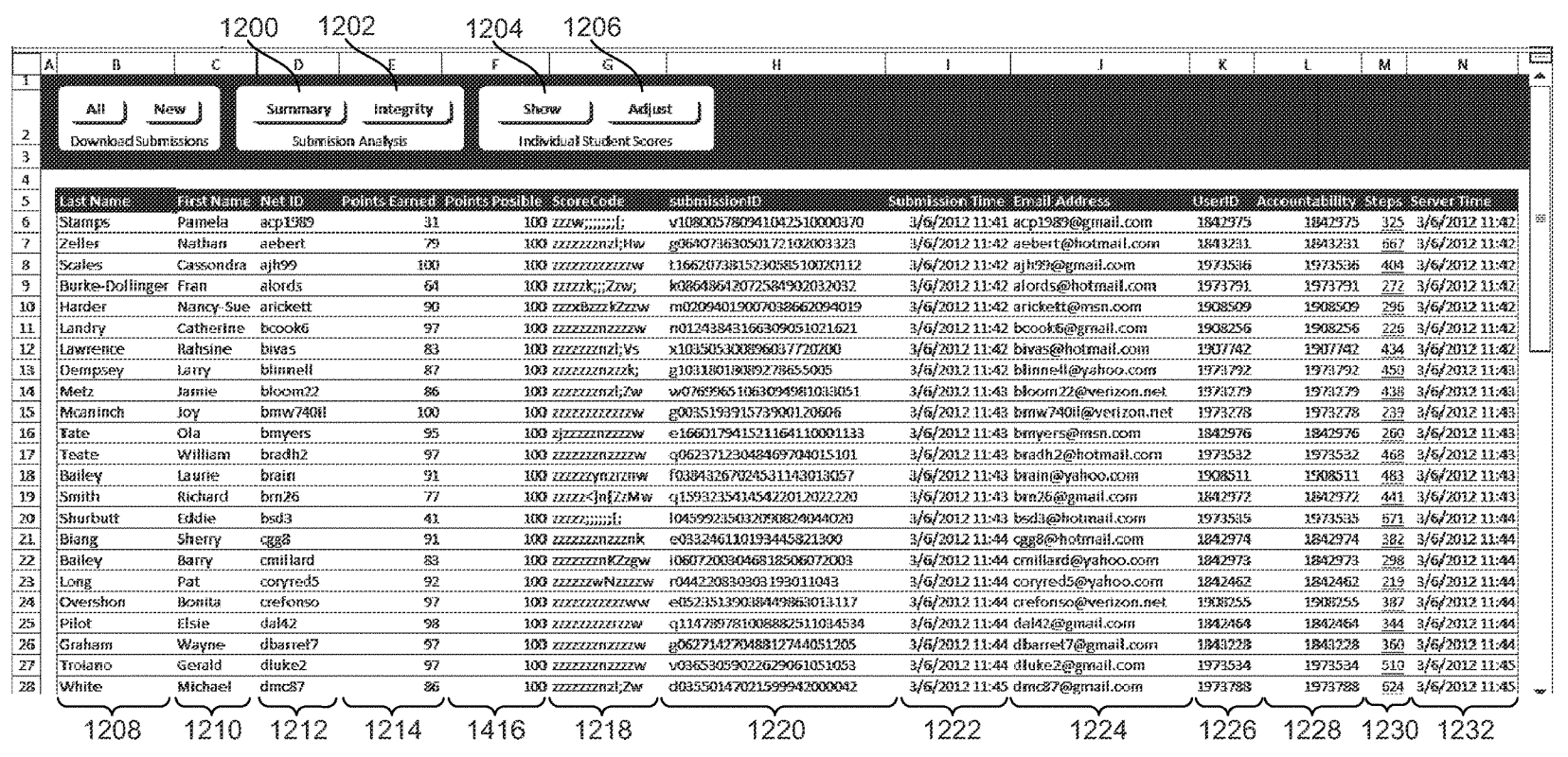

The instructor reviews the summary of the assignment results (block 216, FIG. 2A). FIG. 12 shows an example of a student submissions workbook that summarizes the performance of all the students completing a particular assignment. In this implementation, the student submissions data contains each student's last name 1208, first name 1210, university id 1212 (shown in the figure as net id), points earned on the assignment 1214, points possible on the assignment 1216, score code 1218, submission id 1220 (generated in block 222, FIG. 2B), submission time 1222, email address 1224, user id 1226, accountability id 1228, number of steps taken to complete the assignment 1230, and time the assignment data is received by the server 1232. The student submissions workbook also contains a "Student Summary" button 1200 and "Integrity" button for analyzing student submissions. The workbook also contains two buttons for individual student scores. The "Show" button 1204 for viewing scores and the "Adjust" button 1206 for changing scores. These functions are described in greater detail below.

Figure 13:
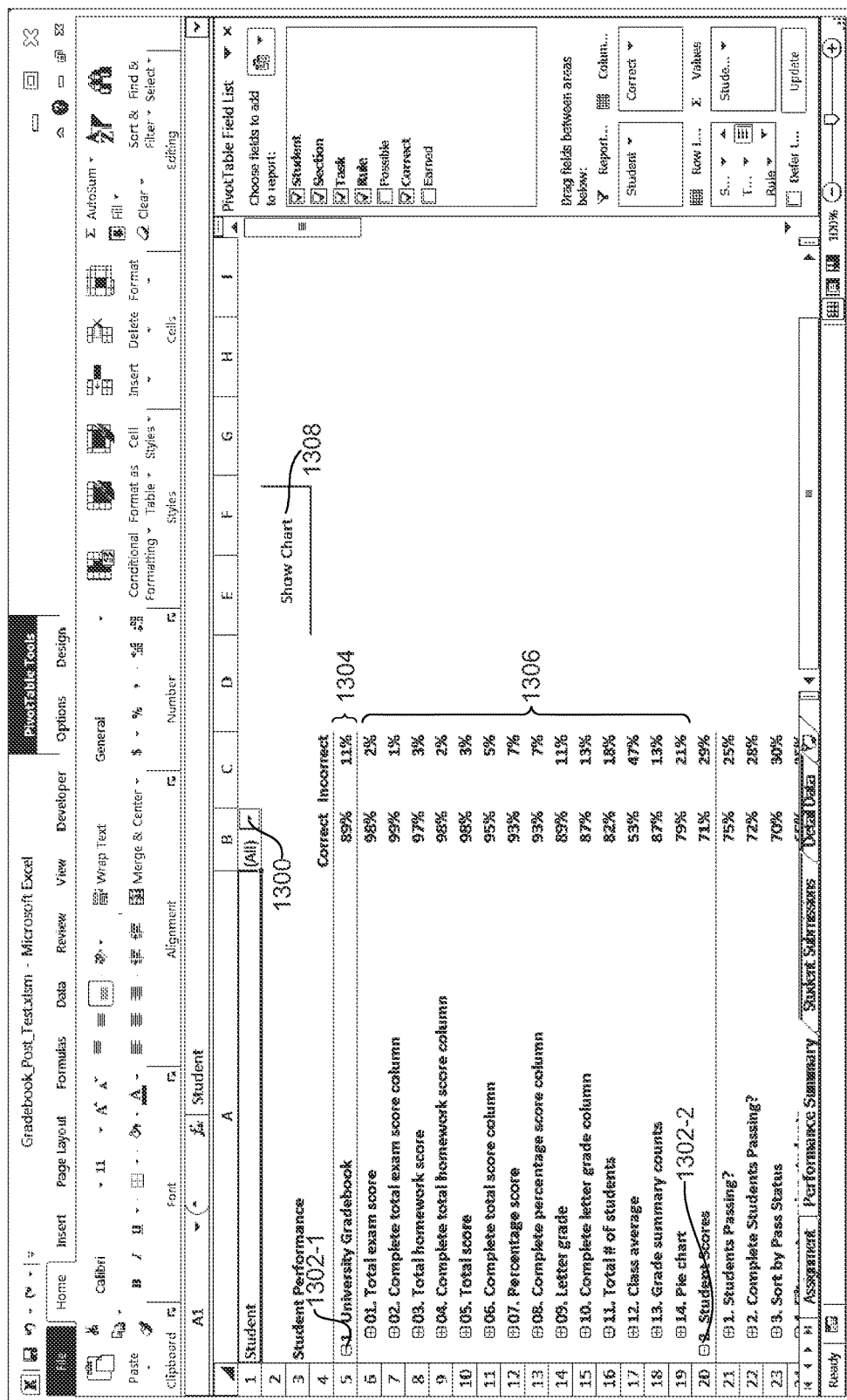
FIG. 13 is an illustrative screenshot of a pivot table with detailed student performance, according to one example of principles described herein.

FIG. 13 shows a pivot table with detailed student performance. Clicking the "Student Summary" button 1200 in FIG. 12 opens a pivot table for displaying detailed data on student performance. The pivot table includes a drop down menu 1300 to select the results for a specific student or all the students. The results may be viewed at different levels of detail using expand/collapse buttons 1302-1 and 1302-2. The results may be viewed by percentage correct and incorrect by task set, by task, and by rule. In the example shown in FIG. 13 the results have been expanded to include task sets 1304 and their respective tasks 1306. To view a chart of the results the instructor clicks the "Show Chart" button 1308.

Figure 14:
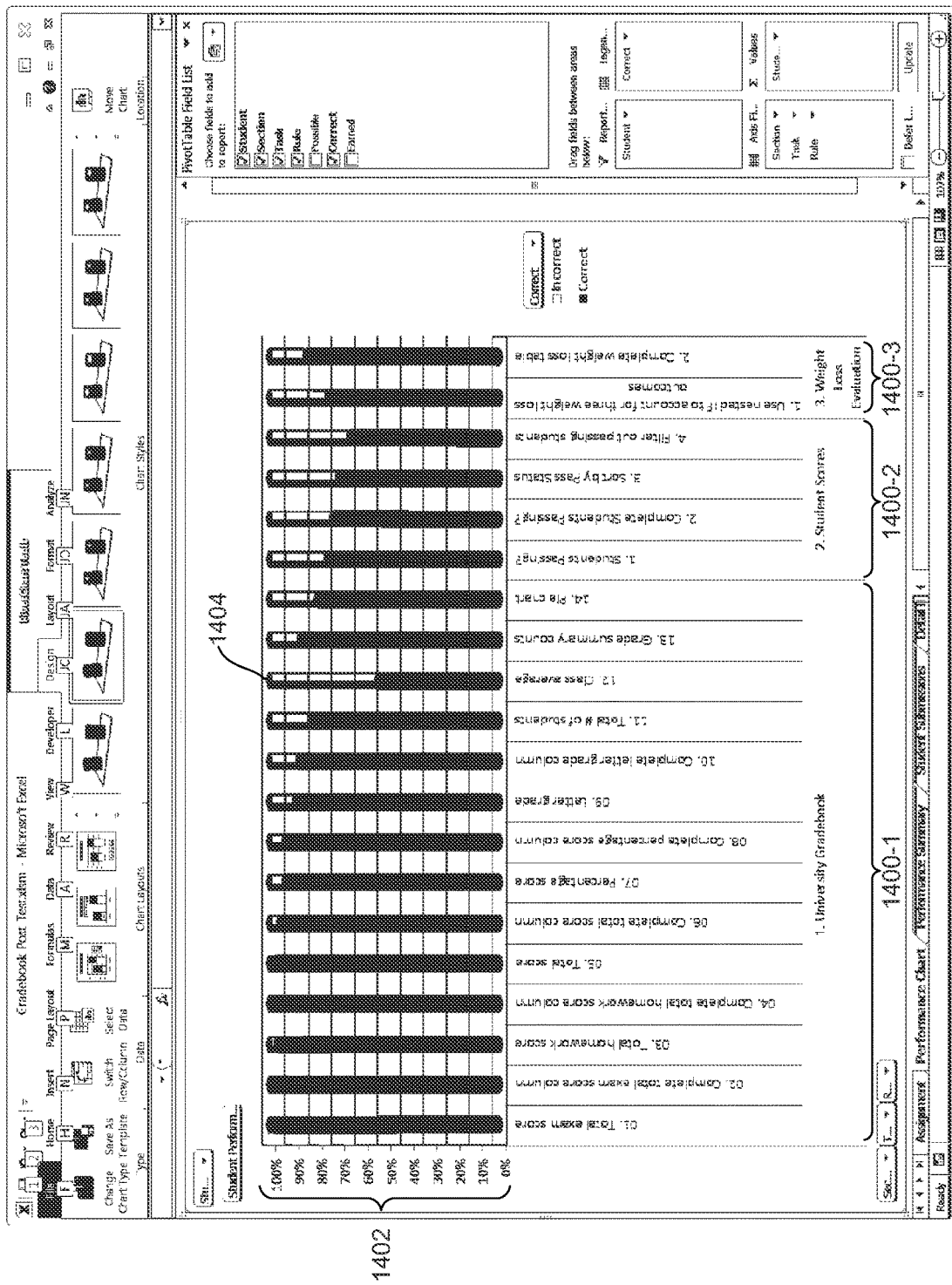
FIG. 14 is an illustrative screenshot of a chart summary of student performance, according to one example of principles described herein.

FIG. 14 shows a chart summary of student performance on the assignment. The chart shows the results for each task set: "University Gradebook" 1400-1, "Student Scores" 1400-2, and "Weight Loss Evaluation" 1400-3. In this example, the results of each task set are broken down by task and the result for each task is measured in percent correct 1402. In other implementations the chart may use other metrics for displaying the results such as number of points out of points possible, etc. Viewing the students' results in a chart may help the instructor to analyze the results. For example, the instructor can quickly see that the result for task twelve 1404 of the task set "University Gradebook" 1400-1 is abnormally low when compared to the results of the other tasks.

Figure 15:
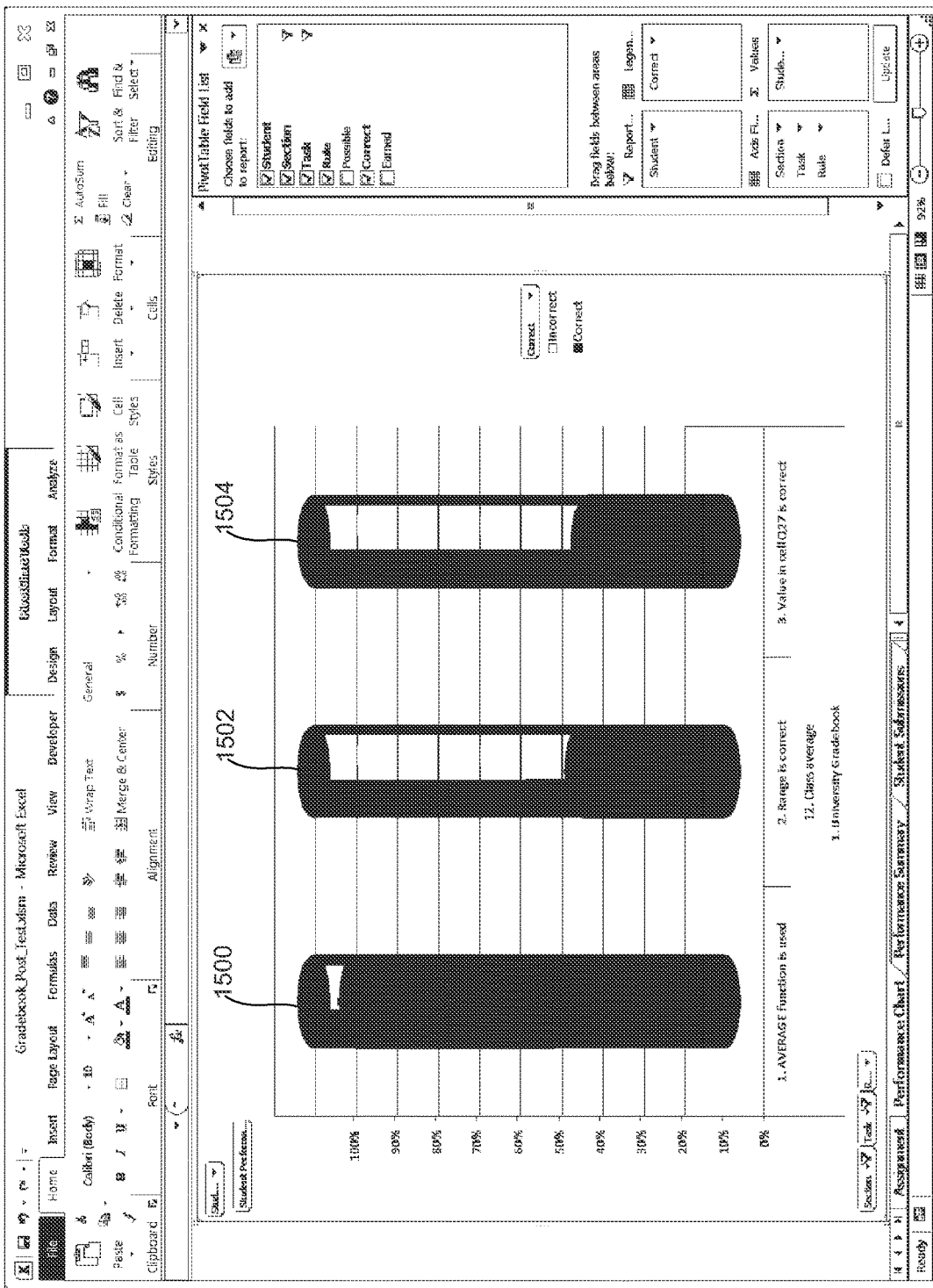
FIG. 15 is an illustrative screenshot of a detailed chart of student performance on a set of rules, according to one example of principles described herein.

The instructor may want to know why so many students missed task twelve 1404 of the first task set 1400-1. To do this he double clicks on the graph for the problem 1404. This shows a chart of the results for the individual rules of a task. FIG. 15 shows a breakdown of student performance on the individual rules in task twelve, Task twelve instructs the students to calculate an average score from range of class data. The rules specify that The "AVERAGE" function should be used, the range should be correct, and the value in cell Q27 should be correct. Viewing the detailed data displayed graphically allows the instructor to quickly see that most students understood how to use the "AVERAGE" function 1500, but had a difficult time selecting the correct range 1502. The instructor may also observe that not being able to select the correct range probably led the students to get the incorrect value in cell Q27 1504. Using this insight, the instructor may do a review over how to select the correct range and thus effectively target weak areas in the students' learning.

Figure 16:
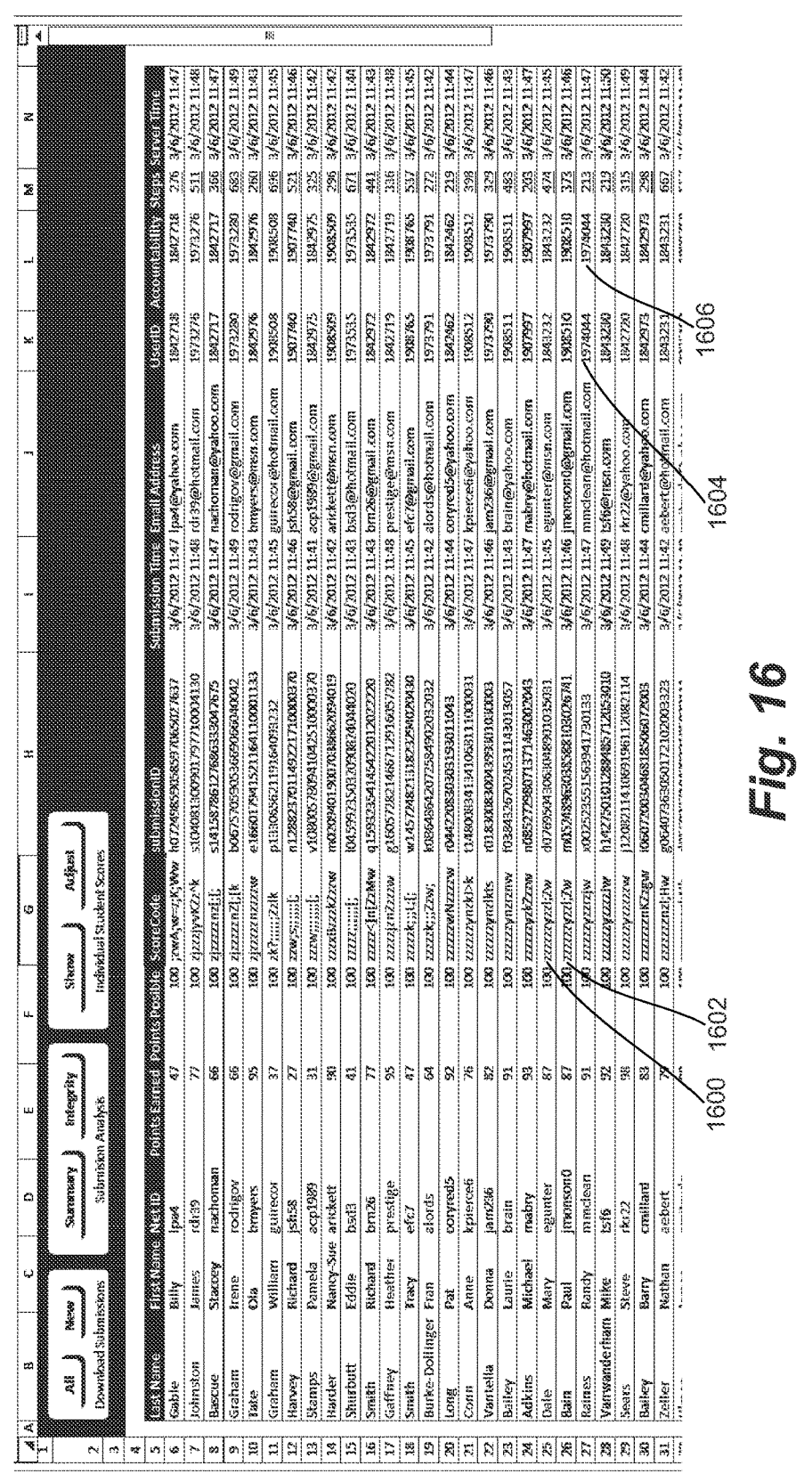

The instructor may also perform an integrity analysis on the student submissions. Clicking the "Integrity" button 1202 in FIG. 12 performs an analysis on the student submissions to highlight which student submissions are unusually similar. An example of this analysis is shown in FIG. 16. The data from the student submissions page is sorted to group similar student score codes. Score codes are a concise method of indicating the performance of a student for each of the rules used to evaluate the tasks. The score codes of Mary Dale 1600 and Paul Bain 1602 are exactly the same. This shows the instructor that these two students not only got the same score, but also arrived at that score by getting the exact same rules in each task correct and incorrect. This indicates, with a high probability, that these students collaborated on the assignment. The instructor may also check to see that a student submitted data from the same workbook that they received. For example, in FIG. 16 the data shows Randy Raines received a workbook marked with his user id 1604 and submitted data from a workbook that was marked with the same number 1606. This shows that Randy probably submitted work from his own workbook and did not submit the solution data from another student's workbook.

The instructor may view individual student score reports by selecting the row corresponding to a student and then clicking the "Show" button 1204 in FIG. 12. FIG. 17 shows an example of an individual student score report. A task set 1700 is shown with its corresponding tasks 1702-1, 1702-2, 1702-3, and 1702-4, total points possible 1704, and task set description 1706. Each individual task has a number of points possible and a task description. To the right of the task sets are evaluations 1708-1, 1708-2, 1708-3, and 1708-4 of the student's performance on each task. These evaluations include an icon that shows if the task is correct or incorrect, number of points earned, and a message that specifies how points were lost. For example, the evaluation of the first task 1708-1 shows that the student misses the problem, but still gets three points out of five. There are two missed points because "The value in cell N65 is not correct." Below the individual evaluations is an evaluation summary 1710 that shows the total number of tasks correct 1712, total number of points earned 1714, and a sentence summarizing the percentage correct on the task set 1716.

Figure 18:
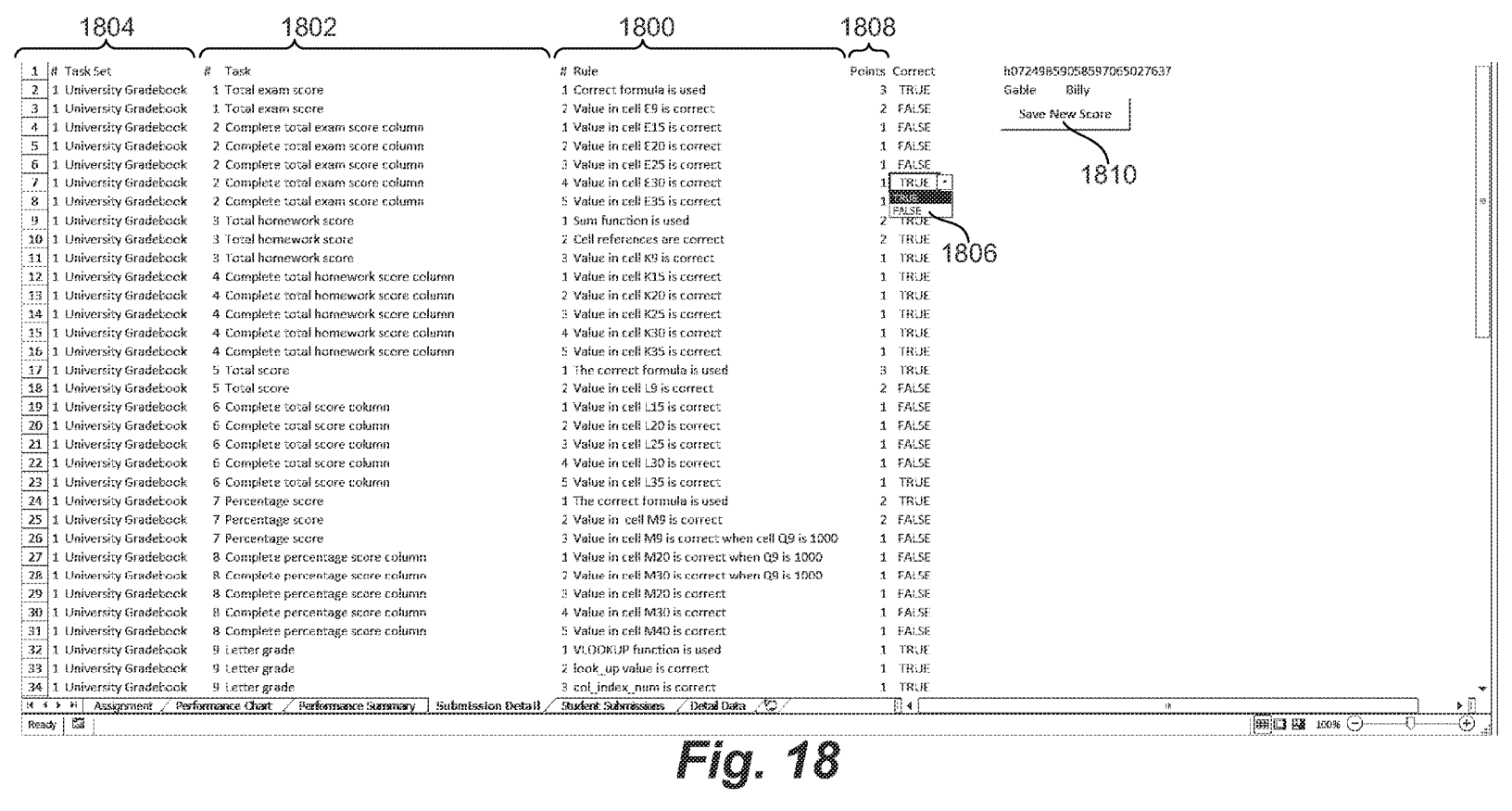

The workbook also gives the instructor the ability to adjust students' scores. To do this, the instructor selects the row corresponding to a student and then clicks the "Adjust" button 1206 in FIG. 12. FIG. 18 shows an example of editing a student report. A column containing each rule is shown; next to this column is a column that shows the task 1802 and column that shows the task set 1804 for each rule. A student's score on a rule may be changed by choosing the new value (true or false) using the drop down menu in 1806. Additionally, the number of points for a given rule may be changed by replacing the corresponding value in the points column 1808. Changes may then be saved by clicking the "Save New Score" button 1810.

The principles described above provide a number of advantages, including the ability for assignment software to evaluate student solutions locally on the student's computer. Because of this, the server need not run the evaluation, thus saving valuable server time. Also, when the student submits the assignment to the server, the assignment file itself is not sent to the server, only the data from the assignment evaluation. In the example of an assignment for teaching Excel, Excel workbooks often have file sizes of in range of megabytes for typical assignments. However, the size of the evaluation data sent back to the server is often several orders of magnitude smaller than the complete assignment file. For example, the workbook may have a size of approximately one megabyte while the data submitted to the server has a size of only a few kilobytes. Using the principles described above, the server can be expected to handle around one thousand times less data than if conventional principles were used. This saves on expensive server time and costly memory requirements for servers and for the instructor's computer.

Another advantage is that the principles described above improve an instructor's ability to track student integrity and automate much of the work in that process. An instructor can detect with high probability the events where students may be copying from other students, students are working in groups when they are expected to work alone on an assignment, and where students may be turning in data from another student's assignment as their own.

The instructor also has the advantage of having a log of changes and times of changes in the student's assignment. This allows the instructor to see a student's process in coming to a solution. This helps the instructor to understand better why students are getting tasks wrong, why they get task right, and how students can be taught to do tasks more correctly and more quickly.

Another advantage is that the student can use a task guide to help them complete the assignment. The task guide allows the student to navigate from task to task in an assignment; it also contains instructions for the current task and allows the students to keep track of which tasks are complete. This helps the student to spend more time learning while doing the assignment and less time trying to find out what to do.

In the example given above, the assignment is created using plain text in an Excel workbook; the plain text workbook defines the assignment workbook. To aide an instructor in making his or her own assignments or editing existing assignments, an assignment guide with a graphical user interface (GUI) is provided. The assignment guide may be used to display, navigate, and edit assignment data from a plain text assignment workbook. This data may be provided to the instructor or may be created by the instructor. In addition to the plain text assignment data, the assignment guide uses a library of VBA procedures and functions for evaluations. VBA procedures and functions for evaluations are used to take the instructor's input and change it to the correct format for defining an assignment. The assignment guide also uses interview template trees. An interview template defines the questions asked to guide an instructor through the steps required to edit or create an assignment. A template tree is a data structure that holds several templates that are connected by branches. Different branches of the tree are traversed depending on the answers the instructor provides to the interview template questions. FIGS. 19-30 provide further details regarding an illustrative implementation for creating an assignment in Excel.

Figure 19A:
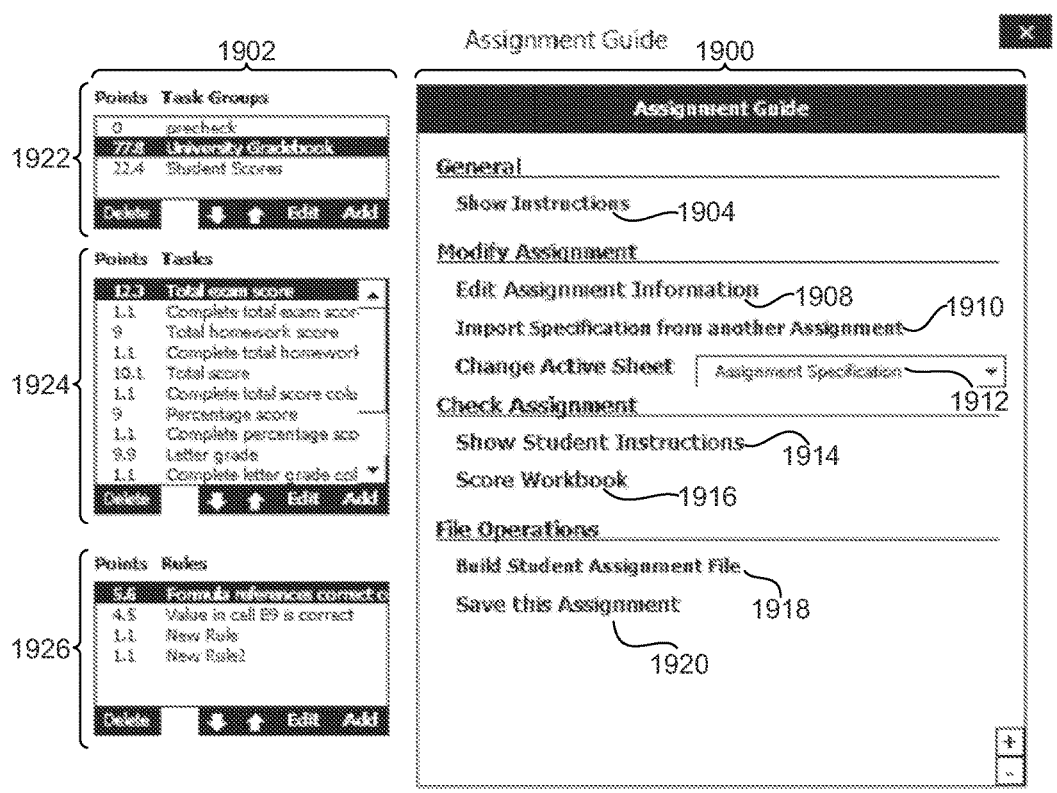
FIG. 19A is an illustrative screenshot of an assignment guide for viewing, navigating, and editing assignments, according to one example of principles described herein.

FIG. 19A shows an assignment guide for viewing, navigating, and editing assignments. The main menu 1900 of the assignment guide contains several options for working with assignments. Options are selectable by clicking on their respective links. The link, "Show Instructions" 1904 brings up instructions on how to use the assignment guide. The link, "Edit Assignment Information" 1908 navigates to a menu that allows the instructor to edit general information regarding the assignment (as described in detail in FIG. 21 below). The link, "Import Specification from another Assignment" 1910 navigates to a menu that allows the instructor to import an assignment that has already been created (as described in detail in FIG. 20 below). The dropdown menu, "Change Active Sheet" allows the instructor to choose which sheet in the assignment workbook is active. The instructor can check the assignment using the links, "Show Student Instructions" 1914 and "Score Workbook" 1916. Using the, "Show Student Instructions" link the instructor can view the instructions in the format the student will see them and check them for accuracy. Using the, "Score Workbook" link the instructor can have the assignment workbook scored to make sure that the assignment grading is working properly. The main menu also provides a link to, "Build Student Assignment Foe" 1918. The instructor selects this option when he or she is ready to generate the assignment workbook to be completed by the students. To generate the assignment workbook, executed VBA code may follow a similar process described above to generate the assignment from the plain text workbook. The link, "Save this Assignment" 1920 takes all the changes made to the assignment and stores them in a file.

Figure 19B:
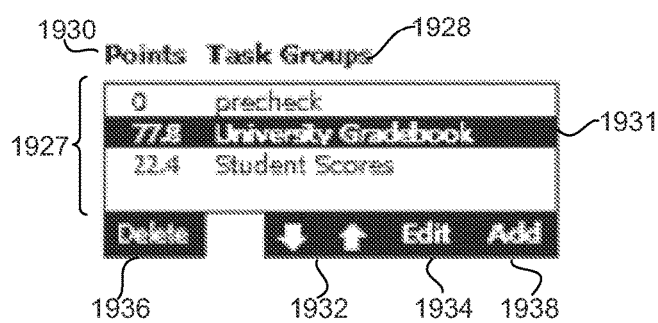
FIG. 19B is an illustrative screenshot of a navigator to view and edit task groups according to one example of principles described herein.

The second portion of the assignment guide is the assignment navigator 1902. In this implementation, the assignment navigator has three navigation menus that correspond to the three levels of hierarchy in an Excel assignment. There is a navigator for task groups 1922, tasks 1924, and rules 1926 respectively. FIG. 19B shows an example of a navigator for viewing and editing task groups (navigators for viewing and editing tasks and rules have a similar structure and function). The task group navigator includes a table of the task groups that included in the assignment. The table includes columns that specify the task group's name 1928 and the amount of points assigned to that task group 1930. In this example, the task group titled, "University Gradebook," is selected; the instructor may navigate to other task groups in the table by clicking on the name of the desired task group. The order in which the task groups are presented to the student in the completed assignment can be changed using the up and down arrow buttons 1932. Once the desired task group is selected the instructor has two options: the instructor can edit the task group by clicking the "Edit" button 1934 or delete the task group by clicking the "Delete" button (editing task groups, tasks, and rules is described below in detail in FIGS. 22-29). Additionally, the instructor may add a new task group by clicking the "Add" button 1938. When a task group is selected in the task group navigator the values in the tasks and rules navigators update with the data that corresponds to the task group that is selected.

Figure 20:
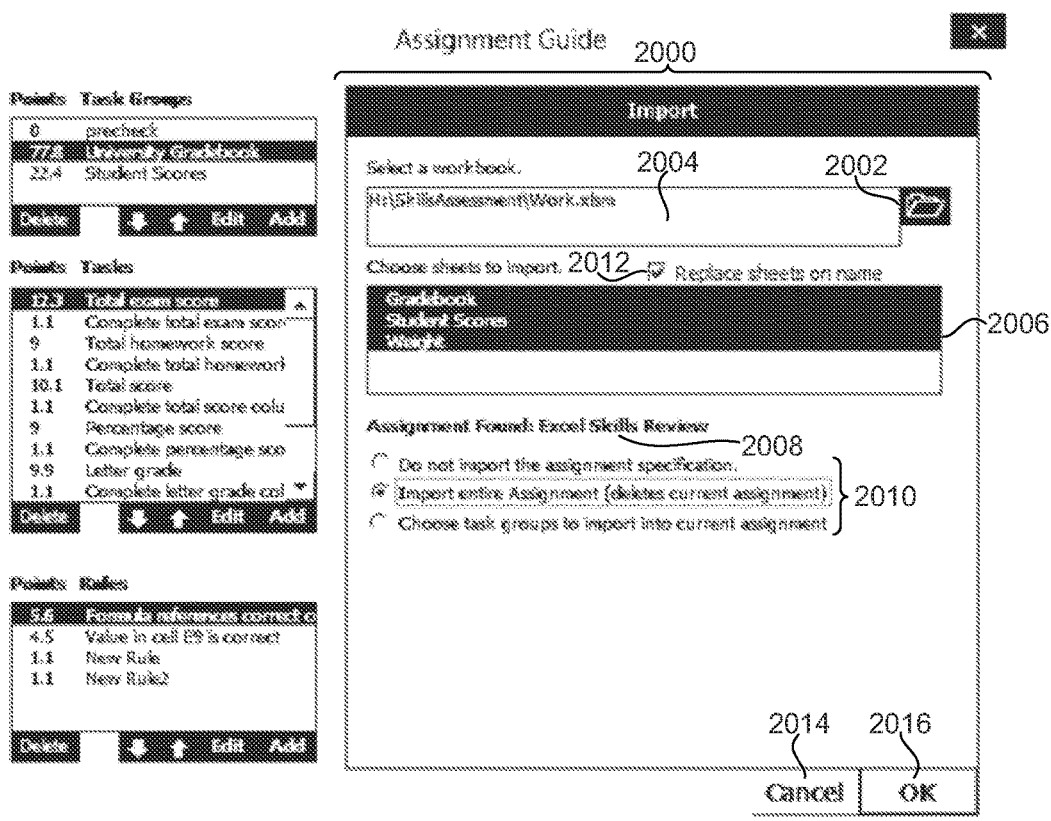
FIG. 20 is an illustrative screenshot of a menu for importing an assignment, according to one example of principles described herein.

FIG. 20 shows a menu for importing an assignment. An instructor may not want to create an entire assignment by him or herself. It may be desirable for the instructor to take an assignment that has been provided and make changes to it in order to meet the learning needs of his or her students. The import menu 2000 (accessed by the link 1910 in the main menu FIG. 19A) provides an interface for the instructor to import a previously created assignment. To select a workbook, the instructor clicks on the folder icon 2002 and navigates a file system to the path where the assignment is located and cocks on the assignment file. The chosen file path is shown in a text box 2004. Once an assignment the is selected, a table 2006 is populated with the names of the sheets contained in the assignment file and the assignment name is shown 2008. At this point the instructor is presented with several options concerning the assignment file, the instructor can choose to: not import the file, import the whole file (this deletes the current assignment), or choose specific task groups to import into the assignment. At any time the instructor can choose to abort the import process by clicking the "Cancer" button 2014 or confirm his or her choices and click the "OK" button 2016. If the instructor chooses to import data in the assignment file and the "Replace sheets on name" checkbox 2012 is checked, then any sheets currently loaded that match the names of sheets to be imported are replaced by the imported sheets.

Figure 21:
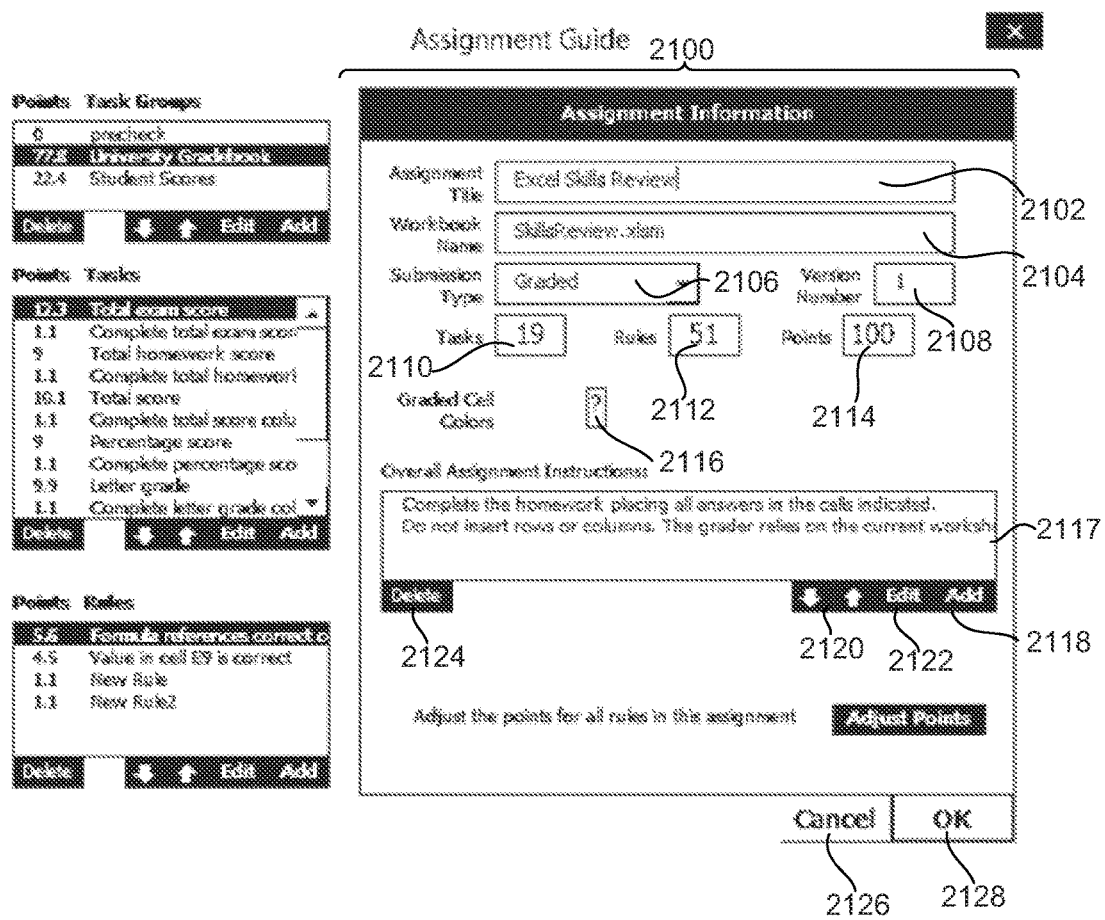
FIG. 21 is an illustrative screenshot of a menu for editing assignment information, according to one example of principles described herein.

FIG. 21 shows a menu for editing general assignment information. The assignment information menu 2100 (accessed by the link 1908 in the main menu FIG. 19A) includes text fields, a dropdown menu, and a table for defining general assignment attributes. Text fields include: the assignment title 2102, the workbook name 2104, the submission type 2106, version number 2108, number of tasks 2110, rules 2112, and points 2114, and graded cell colors 2116. Overall assignment instructions are entered into a table 2117. A new instruction may be added by clicking the "Add" button 2118. The order in which instructions are displayed to the student in the completed assignment can be changed using the up and down arrow buttons 2120. A particular instruction can be selected by clicking on the relevant text. Once the desired instruction is selected it may either be edited by clicking the "Edit" button 2122 or the "Delete" button 2124. At any time the instructor may choose to cancel editing the general assignment information by clicking the "Cancel" button 2126. To confirm any changes made the instructor clicks the "OK" button 2128.

Figure 22:
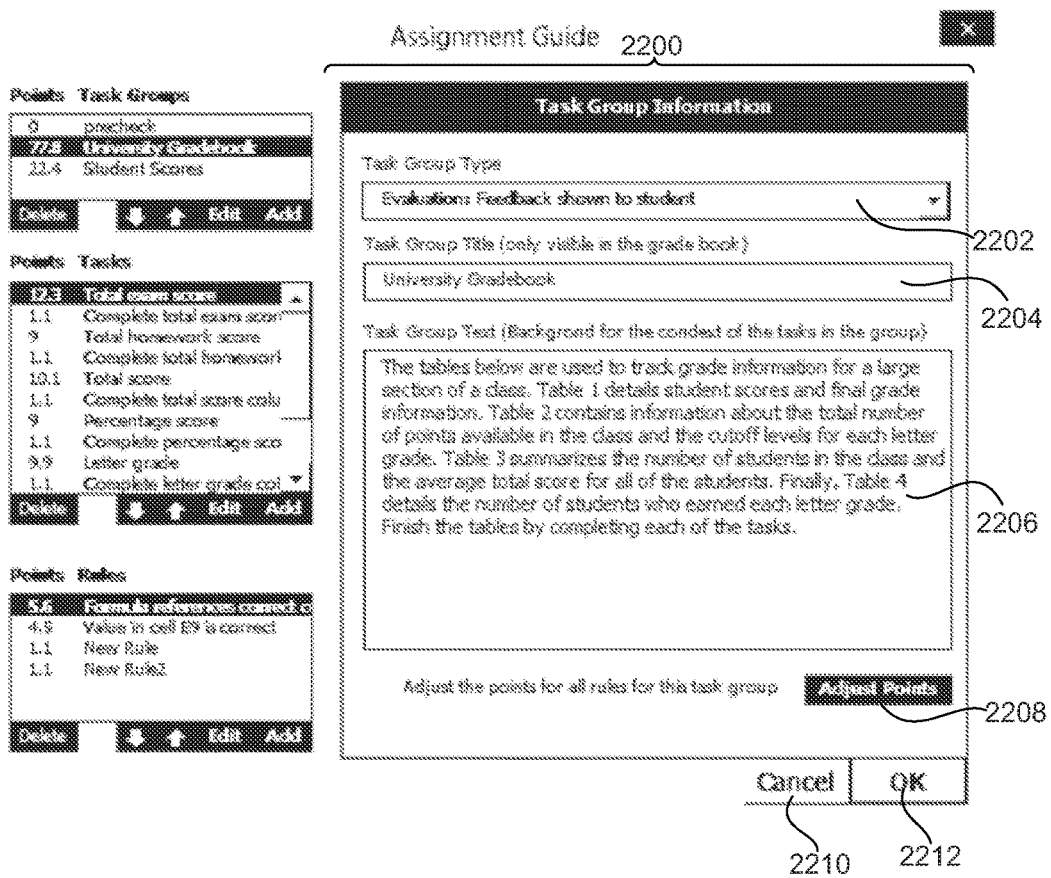
FIG. 22 is an illustrative screenshot of a menu for editing task group information, according to one example of principles described herein.

FIG. 22 shows a menu for editing task group information. The "Task Group Information" menu 2200 (accessed using the task group navigator 1922, FIG. 19) includes several text fields and a dropdown menu for editing task group information and provides the instructor with the functionality to adjust the points allocated to the rules in a task group. The instructor may choose the task group type by selecting the desired type from a dropdown menu 2202, The task group title is defined by the text entered in the "Task Group Title" text field 2204. The "Task Group Text" provides background for the tasks in a task group. This text may be edited using the "Task Group Text" text field 2206. A menu for adjusting the points for all the rules in the task group may be opened by clicking the "Adjust Points" button 2208 (adjusting points is covered in detail below in FIG. 30). At any time the instructor may choose to abort editing task group information by clicking the "Cancel" button 2210. The instructor may save changes made to the task group information by clicking the "OK" button 2212.

Figure 23:
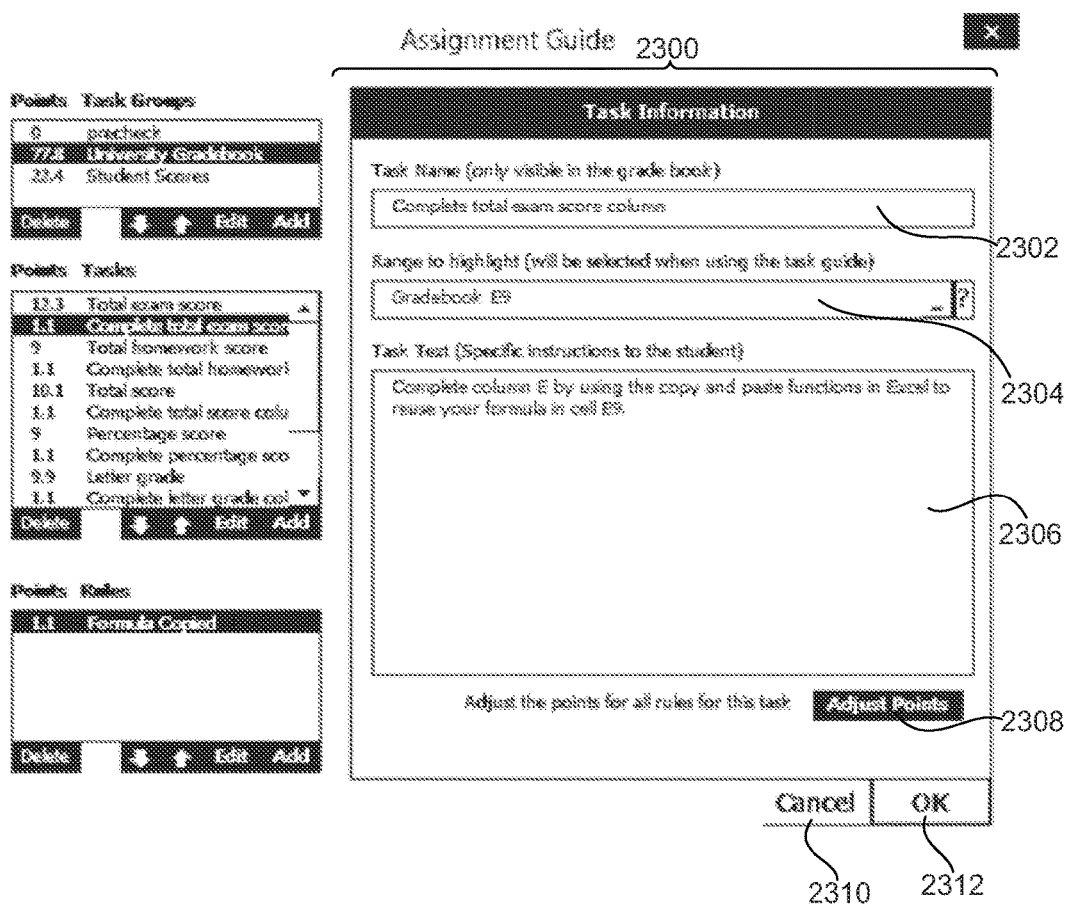
FIG. 23 is an illustrative screenshot of a menu for editing task information, according to one example of principles described herein.

FIG. 23 shows a menu for editing task information. The "Task Information" menu 2300 (accessed using the task group navigator 1924, FIG. 19A) includes text fields and range field for editing task information and provides the instructor with the functionality to adjust the points allocated to the rules in a task. The instructor may define the task name by entering the desired text into the "Task Name" text field 2302. FIGS. 7 and 8 above describe a floating or docked task guide (700, FIG. 7; 800 FIG. 8); in some examples, the task guide highlights a range of cells for the student when the student navigates to a task. This range of cells is selected by the instructor in this menu using the range field 2304. The "Task Text" provides specific instructions for the task to the student. This text may be edited using the "Task Text" text field 2306. A menu for adjusting the points for all the rules in the task may be navigated to by clicking the "Adjust Points" button 2308 (adjusting points is covered in detail below in FIG. 30). At any time the instructor may choose to abort editing task information by clicking the "Cancel" button 2310. The instructor may save changes made to the task information by clicking the "OK" button 2312.

Figure 24:
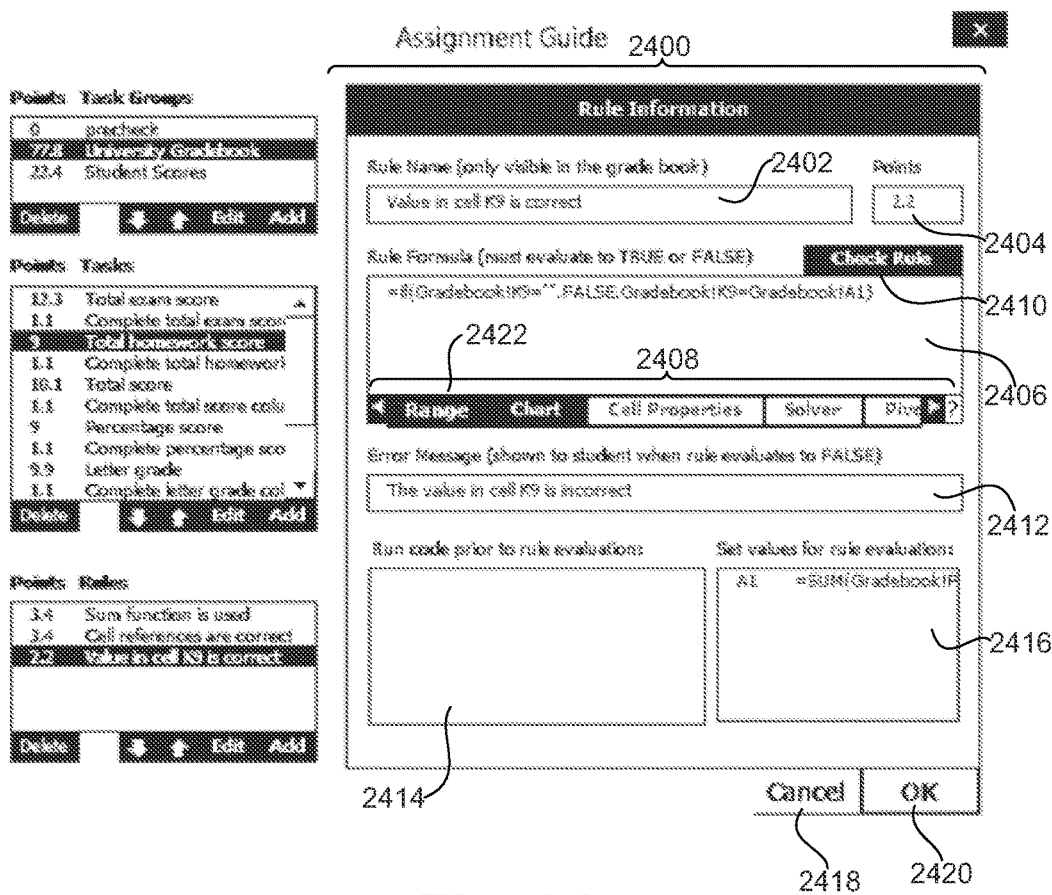
FIG. 24 is an illustrative screenshot of a guide for editing rule information, according to one example of principles described herein.

FIG. 24 shows a menu for editing rule information. The "Rule Information" menu 2400 includes various interface elements for editing and constructing rules. The "Rule Name" text field 2402 is used for defining the name given to a rule. The "Points" text field 2404 allows the instructor to assign a number of points for the rule. The "Rule Formula" text field 2406 contains the rule formula. In some implementations, correctly constructed rule formulas always evaluate to true or false. Rule formulas are executable in Excel. Creating a rule may be a complex, difficult, or time-consuming task. For this reason, various rule guides 2408 are included to guide the instructor in constructing a rule. Types of rule guides provided may include: range, chart, cell property, solver, pivot table, and scenario manager, etc. Rule guides consist of a series of steps that allow the instructor to construct a rule formula without the need to manually write out the rule formula him or herself (a detailed example of using a rule guide is included in the description of FIGS. 25-29). Once a rule is constructed it may be checked by clicking the, "Check Rule" button. This ensures that the rule evaluates to true or false. When a student provides an incorrect solution, it is identified as incorrect because rules set up for that solution evaluate to false. When this happens the student is provided with an error message; this message may be defined by entering the desired message into the "Error Message" text field 2412. In Excel, functions called from a cell within a worksheet cannot change other cells or receive information about which cells other cells reference. This functionality, however, is often helpful in evaluating a rule. As a solution to this issue, VBA code may be run prior to the evaluation of a rule. This works because VBA functions, not executed from within a worksheet, do not fall under the same restrictions as VBA code executed from a cell in an Excel worksheet. When code is required to be run prior to rule evaluation, that code is listed in a textbox titled "Run code prior to evaluation" 2414. Also, certain values may need to be set prior to rule evaluation; these values are set in the "Set values for rule evaluation" textbox 2416. At any time the instructor may abort editing a rule by clicking the "Cancel Button" 2418. The instructor may save the rule information by clicking the "OK" button 2420.

Figure 25:
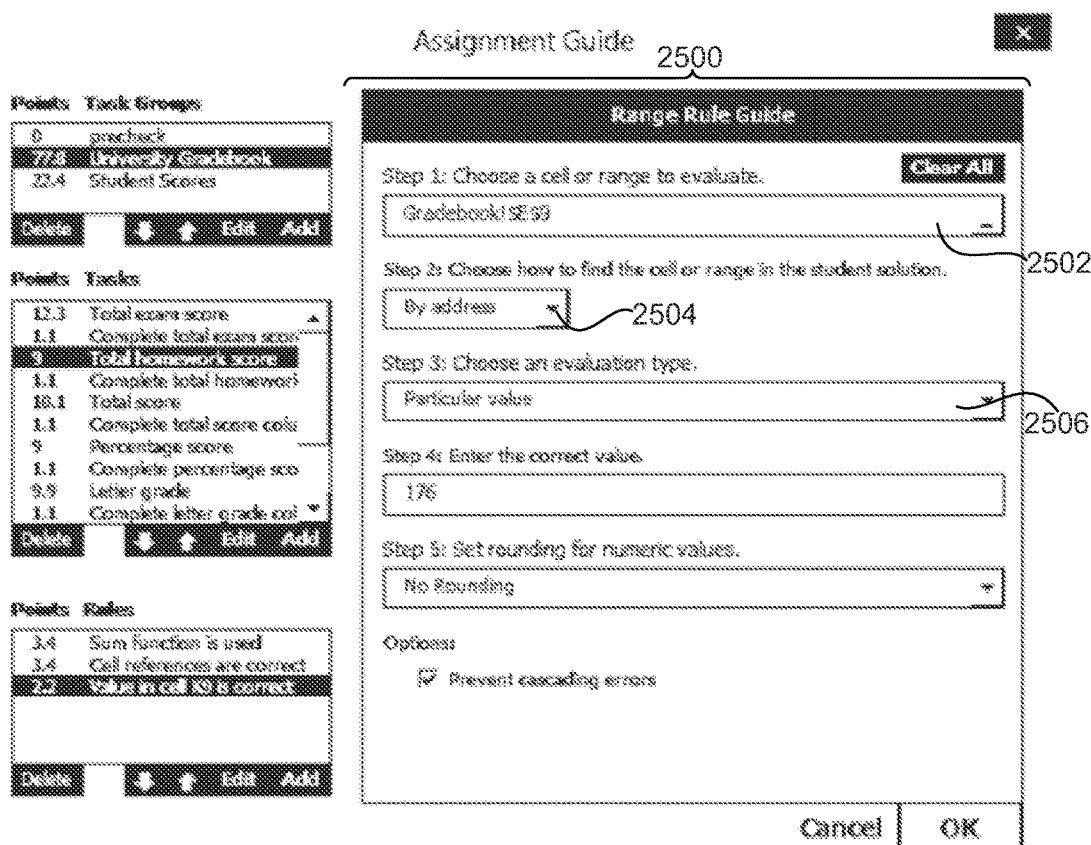
FIG. 25 is an illustrative screenshot of editing range rule information, according to one example of principles described herein.

FIG. 25 shows a guide for editing range rule information. The "Range Rule Guide" 2500 (accessed by clicking the "Range" guide button 2422, FIG. 24) includes various interface elements that may be edited to construct a rule. The first step to construct a range rule requires the instructor to choose a cell or range to evaluate. This value is entered into the corresponding field 2502.

Figure 26:
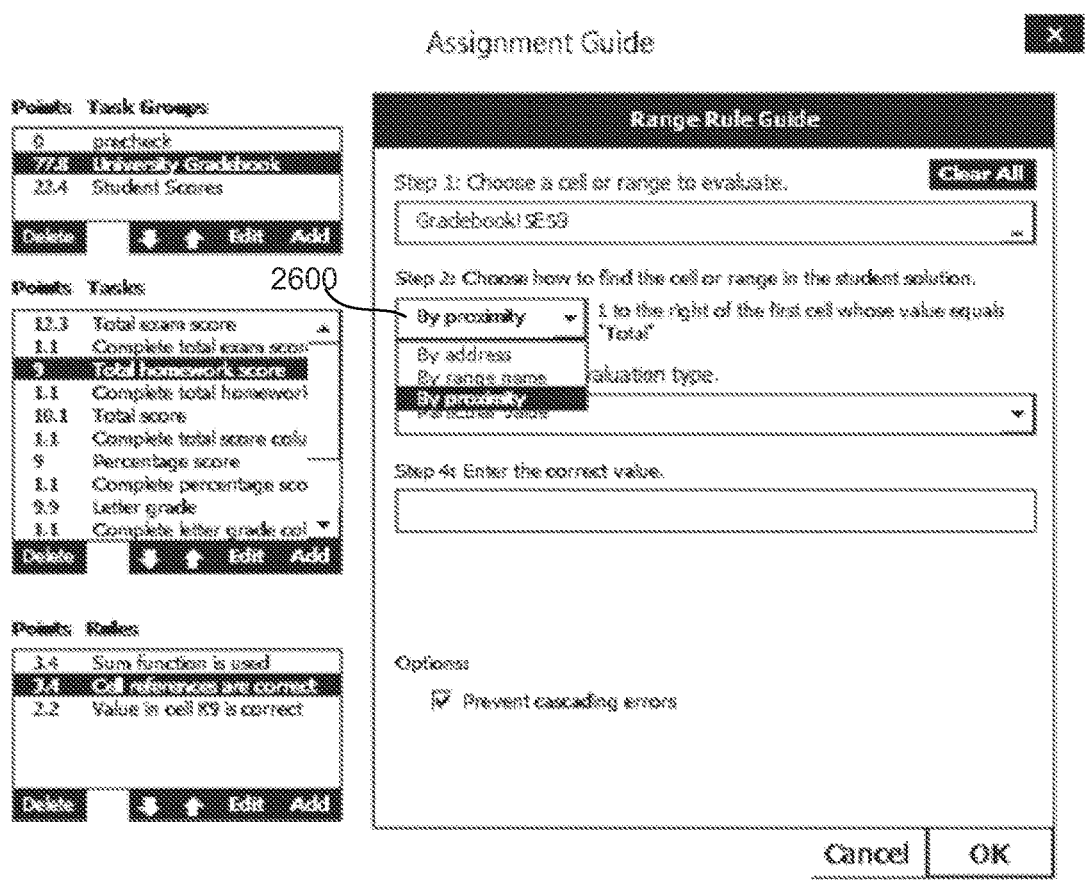
FIG. 26 is an illustrative screenshot of choosing a method for finding a range, according to one example of principles described herein.

Next, the instructor chooses a method of finding the range from a dropdown menu 2504. An example of choosing a method for finding a range is shown in FIG. 26. The dropdown 2600 shows several options for finding a range rule: by address, by range name, and by proximity. The "by address" method requires the cell to be evaluated to be at an exact address. Similarly, the "by range" method requires the cells to be evaluated to have a particular name established in Excel's name manager within the assignment workbook. The proximity method allows the instructor to choose which cell to be evaluated based on its proximity to another location in the workbook.

Figure 27:
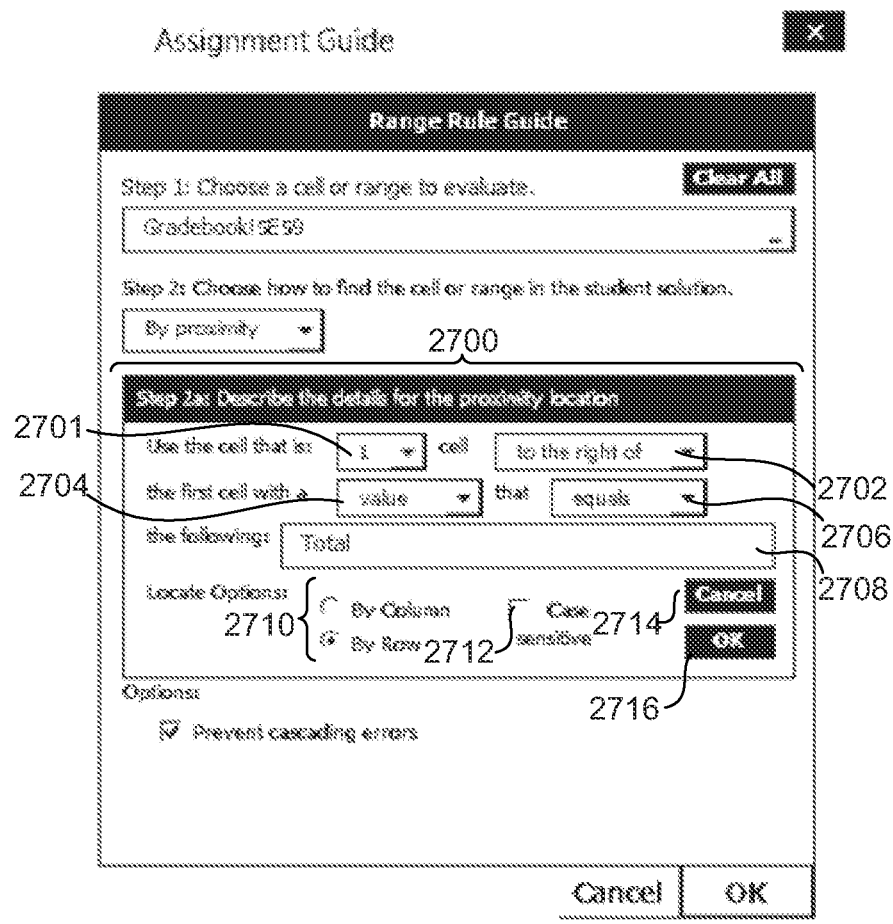
FIG. 27 is an illustrative screenshot of entering the details for a range rule by proximity, according to one example of principles described herein.

For example, FIG. 27 shows the process for entering the details for a range rule by proximity. When the instructor chooses to find a cell by proximity a menu 2700 with options is shown with several interface elements to guide the instructor to enter the details of how the cell is to be found. To do this, the instructor provides directions from a proximity location to the cell he or she wants to evaluate. The directions include: how many cells away the cell to evaluate is from the proximity location 2701 and the direction the cell to evaluate is from the proximity location 2702. Next, the proximity location is defined. To define the proximity location, an attribute of that location is chosen to compare against a chosen attribute value. The attribute is chosen in a dropdown menu 2704; attributes may include the value in the cell, the color properties of the cell, etc. The comparison is also chosen in a dropdown menu 2706; comparisons include: equals, less than, greater than, etc. Then the specific attribute to compare with is defined in a text field 2708. The search for this location can be executed by row or by column by selecting radio buttons 2710. The search can be chosen to be case sensitive or not by selecting a checkbox 2712. In the example shown in FIG. 27 the instructor has chosen to use the cell that is one cell to the right of the cell with a value that equal "Total." The search is done by row and is not case sensitive. At any time the instructor can chose to abort entering in this information by clicking the "Cancel" button 2714, The instructor saves the chosen options by clicking the "OK" button 2716. Similar guides may be provided for constructing rule formulas for charts, cell properties, solvers, pivot tables, scenario managers, etc.

Figure 28:
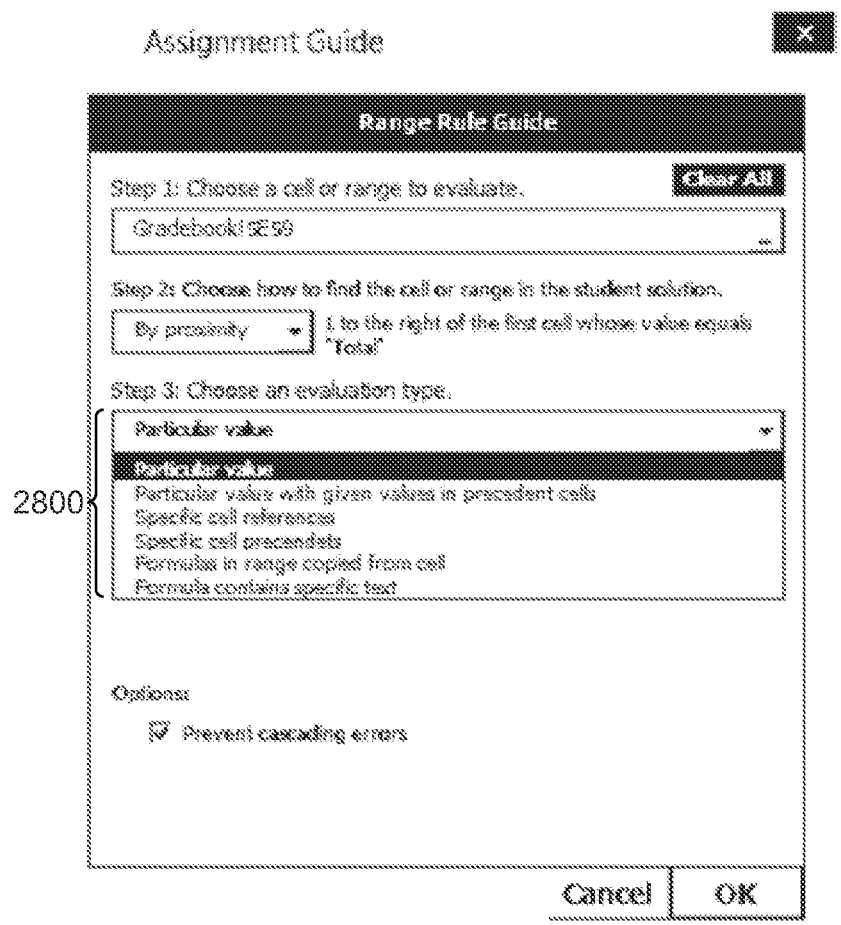
FIG. 28 is an illustrative screenshot of choosing an evaluation type for a range rule, according to one example of principles described herein.

Once a cell or range is chosen in the student solution the type of evaluation to be performed on that cell or range is chosen from the "Choose Evaluation Type" dropdown menu 2506, FIG. 25. FIG. 28 shows an example of choosing an evaluation type for a cell or range. The "Choose Evaluation Type" dropdown menu 2800 shows the different options that may be selected for evaluating a range rule. The instructor may select any one of the options.

Figure 29:
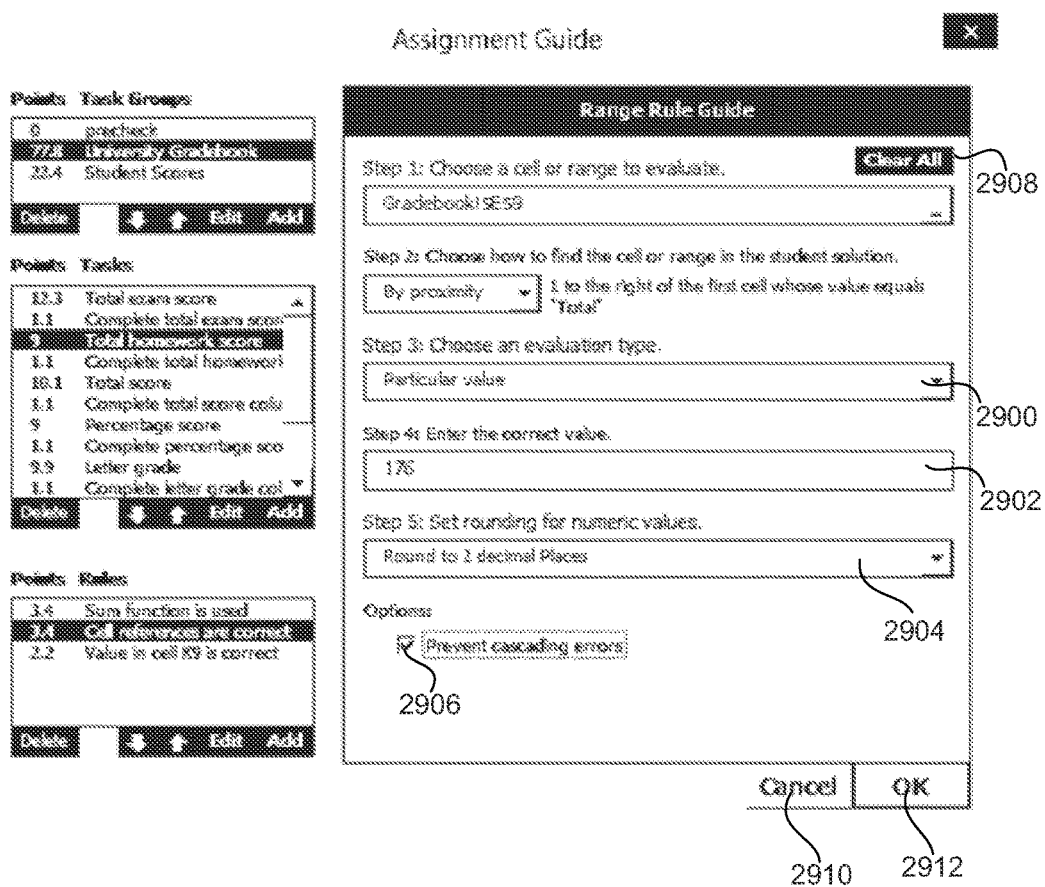
FIG. 29 is an illustrative screenshot of a configured range rule, according to one example of principles described herein.

FIG. 29 shows a configured range rule. After the instructor chooses an evaluation type, the next step is to enter in the value that the student's solution will be evaluated against in a text field. In this example, the instructor has chosen to do the evaluation using a particular value. 2900 and that particular value, "127", is entered a text field in "Step 4: Enter a the correct value" 2902. An option for rounding numbers is also chosen 2904 to round to two decimal places. If an instructor wants to prevent a student from being penalized for cascading errors he may check the checkbox labeled, "Prevent cascading errors" 2906. Cascading errors occur when a value for a first solution is used as an input to a second solution. The second solution may be correct, but evaluate incorrectly based on bad input. At any time, the instructor may click the "Clear All" button 2908 to clear the selections and entries made in the range rule guide. The instructor may also abort editing in the range rule guide at any time by clicking the "Cancer" button 2910. The instructor saves values entered and selected in the range rule guide by clicking the "OK"

Figure 30:
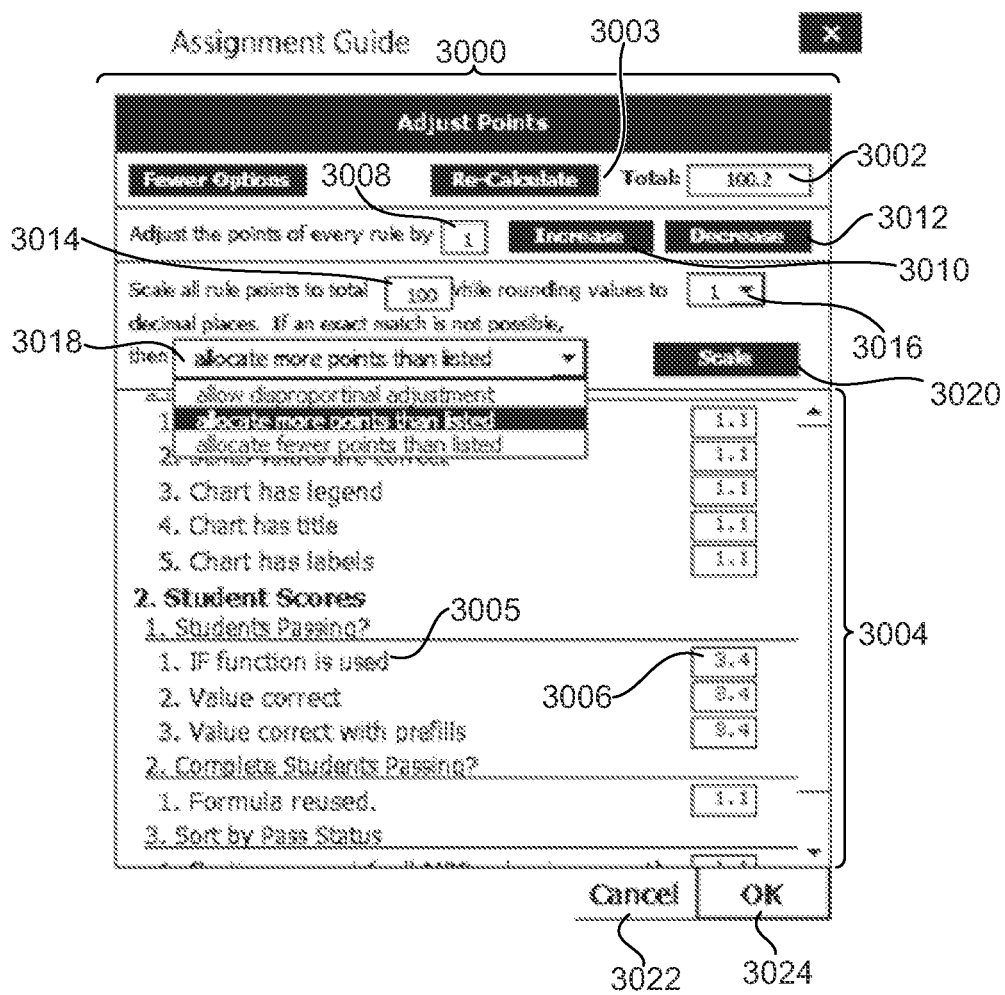
FIG. 30 is an illustrative screenshot of adjusting assignment points, according to one example of principles described herein.

FIG. 30 is shows an example of adjusting assignment points. The assignment guide provides a guide for easily adjusting how points are allocated in an assignment. The "Adjust Points" guide 3000 includes several interface elements for adjusting points in an assignment. The number of points in the assignment is shown in the textbox "Total"

3002. After editing point values this number may be recalculated by clicking the "Re-calculate" button 3003. A scroll view 3004 includes each task group with its respective tasks. Under each task are listed each of its rules and the points allocated to each rule. The points allocated to each rule can be adjusted manually by changing the value in its points field. For example, the rule "IF function is used" 3005 has 3.4 points in its points field 3006. That value may be changed by typing a new value in the field. Points for every rule may be incremented or decremented using the "Increase" button 3010 or "Decrease" button 3012 respectively. The amount each rule is increased or decreased may be set by entering the desired value into a text field 3008. In addition to manually editing point values, points for each rule may be scaled in order for the assignment total to equal a set value. A text field 3014 is used to enter the total points target value. The number of decimal points a point value is allowed to have is set by selecting a value from a dropdown menu 3016. Because an exact match to the target value is not always possible, a dropdown menu 3018 includes options for when this is the case. One option includes allowing point values to lose proportionality in order to get an exact match to the target value. Another option allows more points than the target value to be allocated and still another option allows fewer points than the target value to be allocated. Once these options are set up, the instructor cocks the "Scale" button 3020 and all the point values are scaled to meet the target value according to the options selected. In this example, the target value is 100. Decimal points round out to one decimal place and scaling the values allows more points than the target value. After scaling and recalculating the total, the total number of points is 100.2. At any time, the instructor may exit the adjust points guide by clicking the "Cancel" button 3022. To save any point adjustments the instructor may click the "OK" button 3024.

Among the tasks that instructors do when creating any assignment is assign points to portions of the assignment. This task is made difficult when an instructor has finished an assignment (allocating the total points across various sub-parts) and then decides to add or remove a part of the assignment. If the instructor desires to keep the same number of points for the assignment, he or she needs adjust the points assigned to other existing sub-parts of the assignment. The "adjust points" feature 3000 of the task guide greatly facilitates this process by automating the adjustment of the points. The ability to choose to allow disproportional adjustment or to maintain point proportionality and specify that the point scaling allocate either more or fewer points than the target indicates is novel to this invention. Additionally, the process of specifying detailed rules for the automated evaluation of homework assignments is a necessarily complex task. The development of a structured interview process where the person establishes the rules by answering a few questions about how a rule is to be implemented greatly simplifies the process. Using this approach to mask the complexity of such rule creation is an advantage of the principle described.

The principles described herein may be embodied as a system, method or computer program product. The principles may take the form of an entirely hardware implementation, an implementation combining software and hardware aspects, or an implementation that includes a computer program product that includes one or more computer readable storage medium(s) having computer readable program code embodied thereon.

In one example, the principles described above may be embodied as a digitally administered assignment that includes a workspace for a student, such as an Excel spreadsheet (see e.g. FIG. 6), Microsoft® Word® pages, or other workspace. In some examples, the workspace is capable more than simply recording answers entered by the student. The workspace may capture the student's work within a software environment including student coding, creation of objects such as figures and graphs, manipulation of data within the workspace, and other actions. The digitally administered assignment also includes internal automated grading code (see e.g. FIG. 4 and accompanying description) hidden from and not accessible by the student, the internal automated grading code configured to execute on the student's local computing device and to evaluate work performed by the student in the workspace.

The internal automated grading code in the assignment can perform a variety of functions including: providing a precheck of the assignment for completeness prior to the automated evaluation (see e.g. FIG. 9 and description); generating evaluation data to be submitted to an external computing device (see e.g. FIGS. 1, 12 and description); independently provide feedback to the student on work performed by the student in the workspace. The assignment may also include a task guide incorporated into the assignment, the task guide comprising instructions for tasks in the assignment (see e.g. FIGS. 7, 8 and description). The task guide may also include tools for navigating assignment tasks and a tool to allow the student to mark when a task is complete.

In some examples, the assignment may include a hidden unique student identifier embedded in the workspace, such that copying material from a first student's workspace into a second student's workspace also copies the unique student identifier, thereby allowing the source of the copied material in the second student's workspace to be traced. The principles may be embodied in a variety of methods. For example, a method for digitally administering an assignment may include making an assignment with internal automated grading criteria available to a student and evaluating the assignment using the internal automated grading criteria on the student's local computing device. The method may also include receiving, by a server, evaluation data produced by the internal automated grading criteria executed on the student's local computing device. Actions taken by the student to complete tasks in the assignment may be logged and included in the evaluation data. The internal automated grading criteria comprise code in the assignment that is in hidden from and cannot be accessed by the student. As discussed above, the method may include inserting a hidden unique student identifier in each assignment distributed to a student and verifying student integrity by checking the hidden unique student identifier included in the evaluation data to determine if information has been copied from a first assignment to a second assignment.

The principles may also be implemented in the form of a computer program product for digital assignment administration. The computer readable program product includes a computer readable program code embodied on a computer readable storage medium. Any combination of one or more computer readable storage medium(s) may be utilized. Examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Computer program code for carrying out operations according to the principles described herein may be written in any suitable programming language. Program code embodied on a computer readable medium may be transmitted using any appropriate medium, including but not limited to wireless, wireline, optical fiber cable, RF, etc., or any suitable combination of the foregoing.

In one implementation, the computer readable program code defines a workspace for one or more students and includes code for execution by the student's local device to automatically evaluate work performed by the student in the workspace. The computer readable program code also includes hidden unique identifies in the workspace that are configured to be copied when work is copied from the workspace, wherein the hidden unique identifiers provide evidence of the origin of work in a workspace.

The computer readable program code may also define a task guide configured to sequentially display instructions for tasks in the assignment, indicate specific regions of the workspace that are to be used to accomplish the tasks, and allow the student to check off a task when complete and to move to the next task. In some examples, the computer readable program code also includes a precheck to review the student's assignment prior to submission, display status of the student's assignment including incomplete or incorrect tasks, and to submit the assignment, in which submission of the assignment includes a hidden submission identifier.

The computer readable program code can automatically evaluate the student's work using editable rules and prefill values to replace values in the student's workspace to test the generality of the students work. The computer readable program code further comprises computer readable program code to submit performance data from students to a centralized repository and display the submitted data including an overall score, a score code, and number of steps taken by the student to perform the assignment.

The computer readable program code may also include a number of elements to assist an instructor in the preparation of a digitally administered assignment, including editable assignment templates and an assignment navigator to view and modify the editable assignment templates. The assignment navigator may include an interface for globally and individually adjusting questions, criteria, and points in an assignment. The computer readable program code may also include various implementations of any of the other principles describe above.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A digitally administered assignment comprising:
an electronic workspace for a student;
hidden rules in the digitally administered assignment, the hidden rules comprising:
a number of prefills, wherein:
a prefill determines whether a formula produced by the student works with different sets of data; and
a prefill includes a value to be entered in a specific cell and a revert parameter, wherein after entering the value, a correct formula results; and
wherein the hidden rules are checked to ensure they evaluate to true or false; and
instructions to generate a report that summarizes work performed by the student;
a hidden unique student identifier to track an origin of work within the digitally administered assignment, which hidden unique student identifier:
is a property, which is not readily visible to the student, on a cell in a worksheet of the assignment, which cell comprises calculations of at least one of intermediate steps and final answers;
wherein work performed by the student in the electronic workspace is evaluated based on the hidden rules by:
applying the hidden rules against the work performed by the student;
creating a log of changes the student makes to the digitally administered assignment, including a timestamp for each change;
inserting test values into student generated code to determine a robustness of the work performed by the student;
determining a number of steps to arrive at an answer;
determining a type of the number of steps;
determining how long it took the student to perform the number of steps; and
tracking an origin of the work performed by the student by:
checking the hidden unique student identifier included in evaluation data;
collecting values from the cells with the property; and
determining, based on the collected values from the cells, if information has been copied from a first assignment to a second assignment.

2. The digitally administered assignment of claim 1, wherein the report does not contain all of a student's work.

3. The digitally administered assignment of claim 2, wherein internal automated grading code in the digitally administered assignment executed on a local computing device of the student provides a precheck of the digitally administered assignment for completeness prior to automated evaluation of work performed by the student in the electronic workspace.

4. The digitally administered assignment of claim 3, wherein the internal automated grading code executes locally to independently provide feedback to the student on work performed by the student in the electronic workspace.

5. The digitally administered assignment of claim 1, further comprising a task guide incorporated into the digitally administered assignment, the task guide comprising instructions for tasks in the digitally administered assignment.

6. The digitally administered assignment of claim 5, further comprising tools in the task guide for navigating assignment tasks, in which a tool in the task guide allows the student to mark when a task is complete with the task guide.

7. The digitally administered assignment of claim 1, wherein the hidden unique student identifier is embedded in the electronic workspace, such that copying material from a first student's workspace into a second student's workspace also copies the hidden unique student identifier, thereby allowing the source of the copied material in the second student's workspace to be traced.

8. A method for digitally administering an assignment comprises:
defining an electronic workspace for a student;

generating hidden rules, via a rules interface, to include in a digitally administered assignment performed in the workspace by:
  including a number of prefills in a hidden rule, wherein a prefill determines whether a formula produced by the student works with different sets of data; and
  including in a prefill, a value to be entered in a specific cell and a revert parameter, wherein after entering the value, a correct formula results; and
  check the hidden rules to ensure they evaluate to true or false;
inserting instructions to generate a report that summarizes work performed by the student;
inserting a hidden unique student identifier into the assignment to track an origin of work within the assignment by:
  placing the hidden unique student identifier as a property, which is not readily visible to the student, onto a cell in a worksheet of the assignment, which cell comprises calculations of at least one of intermediate steps and final answers;
evaluating work performed by the student in the work space based on the hidden rules, in which evaluating work performed by the student comprises:
  applying the hidden rules against the work completed by the student;
  creating a log of changes the student makes to the digitally administered assignment, including a timestamp for each change;
  inserting test values into student generated code to determine a robustness of the work completed by the student;
  determining a number of steps to arrive at an answer;
  determining a type of the number of steps;
  determining how long it took the student to perform the number of steps; and
tracking an origin of work performed by the student by:
  checking the hidden unique student identifier included in evaluation data;
  collecting values from the cells with the property; and
  determining, based on the collected values from the cells, if information has been copied from a first assignment to a second assignment.

9. The method of claim 8, further comprising receiving the report, by a server.

10. The method of claim 8, further comprising inserting a hidden unique student identifier in each assignment distributed to the student.

11. A computer program product for digital assignment administration, the computer program product comprising:
a non-transitory computer readable storage medium having computer readable program code embodied therewith, the computer readable program code to:
  define a workspace for a student;
  generate hidden rules, via a rules interface, to include in digitally administered assignment performed in the workspace, by:
    including a number of prefills in a hidden rule, wherein a prefill determines whether a formula produced by the student works with different sets of data; and
    including in the prefill, a value to be entered in a specific cell and a revert parameter, wherein after entering the value, a correct formula results; and
  check the hidden rules to ensure they evaluates to true or false;
  insert instructions to generate a report that summarizes work performed by the student;
  insert a hidden unique student identifier into the digitally administered assignment to track an origin of work within the digitally administered assignment by:
    placing the hidden unique student identifier as a property, which is not readily visible to the student, onto a cell in a worksheet of the digitally administered assignment which cell comprises at least one of intermediate steps and final answers; and
  computer readable program code for execution by a local device of the student without network connectivity to automatically evaluate work performed by the student in the workspace based on the hidden rules, in which evaluating work performed by the student comprises:
    applying the hidden rules against the work completed by the student;
    creating a log of changes the student makes to the digitally administered assignment, including a timestamp for each change;
    inserting test values into student generated code to determine a robustness of the work completed by the student;
    determining a number of steps to arrive at an answer;
    determining a type of the number of steps;
    determining how long it took the student to perform the number of steps; and
  tracking an origin of the work performed by the student by:
    checking the hidden unique student identifier included in evaluation data;
    collecting values from the cells with the property; and
    determining, based on the collected values from the cells, if information has been copied from a first assignment to a second assignment.

12. The computer program product of claim 11, wherein the hidden unique identifier in the workspace is copied when work is copied from the workspace, wherein the hidden unique identifier provides evidence of the origin of work in the workspace.

13. The computer program product of claim 11, further comprising computer readable program code to define a task guide to sequentially display instructions for tasks in the digitally administered assignment, indicate specific regions of the workspace that are to be used to accomplish the tasks, and allow the student to check off a task when complete and to move to the next task.

14. The computer program product of claim 11, further comprising computer readable program code to precheck an assignment of the student prior to submission, display status of the assignment of the student including incomplete or incorrect tasks, and to submit the assignment, in which submission of the assignment includes a hidden submission identifier.

15. The computer program product of claim 11, further comprising computer readable program code to submit performance data from students to a centralized repository and display the submitted data including an overall score, a score code, and number of steps taken by the student to perform the assignment.

16. The computer program product of claim 11, further comprising computer readable program code defining editable assignment templates and an assignment navigator to view and modify the editable assignment templates.

17. The computer program product of claim 11, in which the assignment navigator comprises an interface for globally and individually adjusting points in an assignment.

\* \* \* \* \*